(12) United States Patent
Khan et al.

(10) Patent No.: US 7,559,733 B2
(45) Date of Patent: Jul. 14, 2009

(54) HYDRAULIC CONTROL SYSTEM FOR REFUSE COLLECTION VEHICLE

(76) Inventors: Farooq A. Khan, 24515 Paseo de Toronto, Yorba Linda, CA (US) 92887; Kosti Shivanian, 23 Corporate Plaza #247, Newport Beach, CA (US) 92660

( * ) Notice: Subject to any disclaimer, the term of this patent is extended or adjusted under 35 U.S.C. 154(b) by 617 days.

(21) Appl. No.: 11/433,488

(22) Filed: May 12, 2006

(65) Prior Publication Data

US 2006/0245882 A1 Nov. 2, 2006

Related U.S. Application Data

(62) Division of application No. 10/850,052, filed on May 20, 2004, now Pat. No. 7,070,381.

(60) Provisional application No. 60/471,944, filed on May 20, 2003.

(51) Int. Cl.
*B65F 3/02* (2006.01)
(52) U.S. Cl. .................. 414/408; 414/501; 414/555; 298/22 R; 298/22 C
(58) Field of Classification Search ........... 298/22 R, 298/22 C, 22 P; 414/406–408, 501, 546, 414/555, 732
See application file for complete search history.

(56) References Cited

U.S. PATENT DOCUMENTS

| 3,458,071 | A | * | 7/1969 | Smith |
| 4,983,092 | A | | 1/1991 | Richards |
| 6,312,209 | B1 | | 11/2001 | Duell et al. |
| 6,821,074 | B2 | | 11/2004 | Schreiber et al. |
| 7,070,381 | B2 | | 7/2006 | Khan et al. |

* cited by examiner

*Primary Examiner*—Stephen Gordon
(74) *Attorney, Agent, or Firm*—John J. Connors; Connors & Assoc. Inc

(57) ABSTRACT

A front loading refuse vehicle includes at least one positive displacement pump having an associated valve system in fluid communication with drive mechanism that operates a lifting arm, packer, a rear door of the vehicle, and a hoist for a refuse storage body. The valve system includes at least one closed-centered valve with a spool mechanism having a pressure compensator to maintain a constant flow rate of fluid through the valve regardless of differential in pressure across the valve for any given position of the spool mechanism. Two pumps with two separate hydraulic control systems are used with a side loading refuse vehicle. An electrical/electronic control system including a microprocessor operates the valve systems for each vehicle.

13 Claims, 24 Drawing Sheets

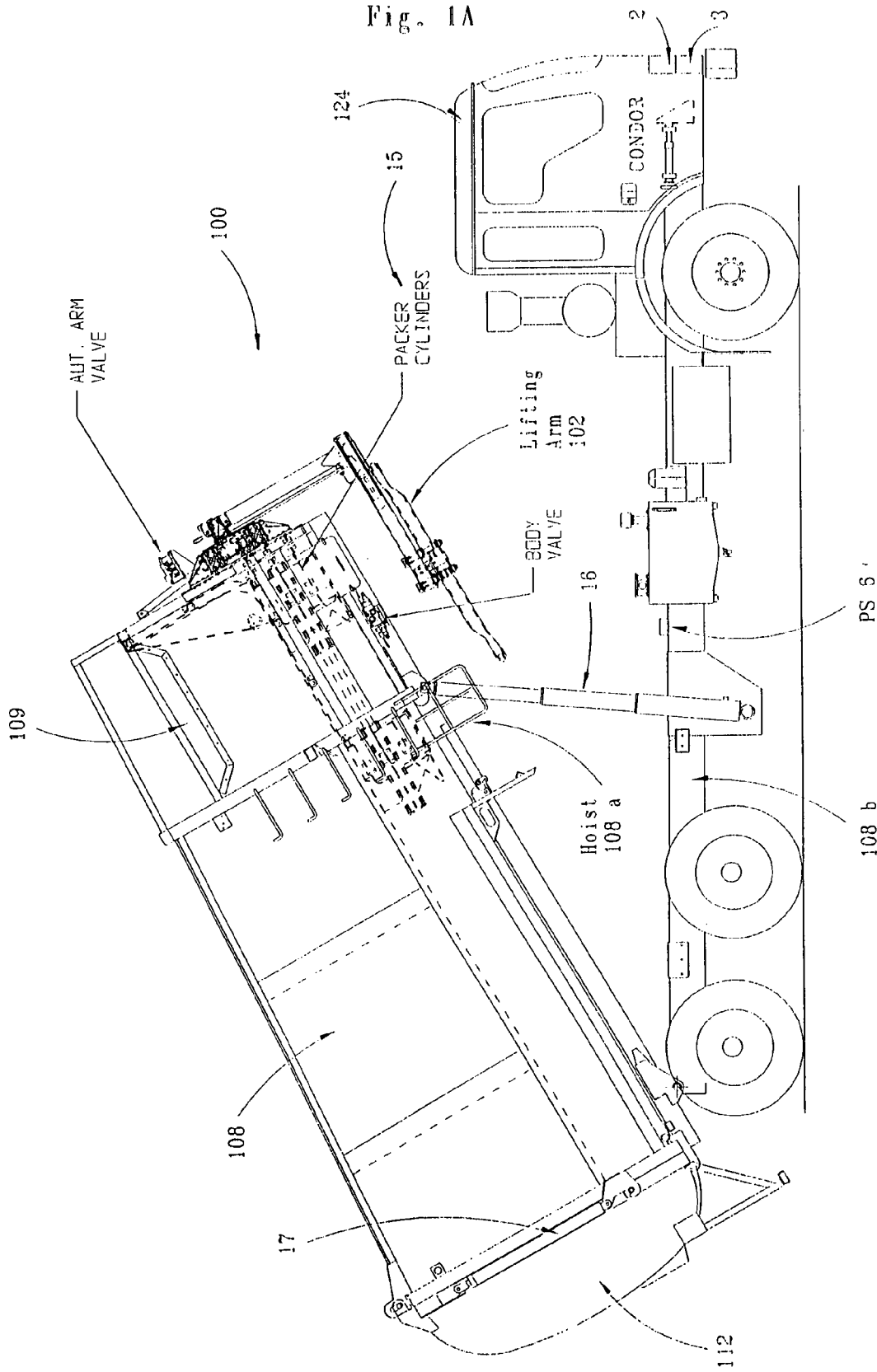

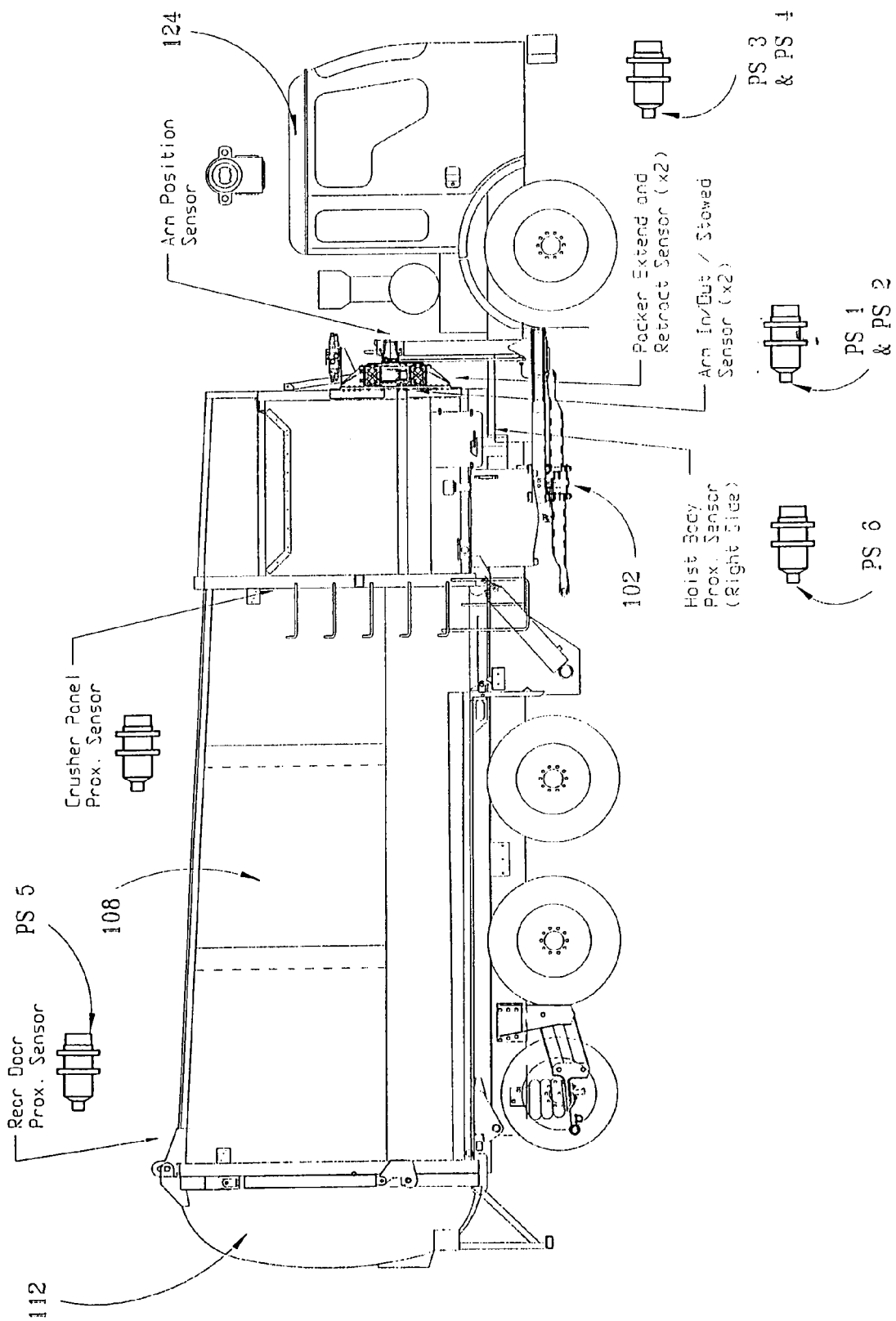

Fig. 6 A

| # | PART # | DESCRIPTION | QTY. |
|---|---|---|---|
| 1 | | BODY VALVE | 1 |
| 2 | | ADAPTER | 2 |
| 3 | | TUBE | 1 |
| 4 | | ADAPTER "T" | 1 |
| 5 | | HOSE (GH 781) (25"x3/8") M/F | 1 |
| 6 | | HOSE (GH 781) (35"x3/8") M/F | 1 |
| 7 | | ADAPTER | 3 |
| 8 | | ADAPTER ELBOW | 5 |
| 9 | | HOSE (GH 781) (28"x1") F/F Elbow | 1 |
| 10 | | ADAPTER | 1 |
| 11 | | REDUCCION | 1 |
| 12 | | ADAPTER "Y" | 1 |
| 13 | | ADAPTER | 1 |
| 14 | | TUBE | 1 |
| 15 | | HOSE (GH 781) (50"x1-1/4") M/M | 1 |
| 16 | | TUBE | 1 |
| 17 | | HOSE (GH 781) (28"x3/8") M/F Elbow | 1 |
| 18 | | TUBE | 2 |
| 19 | | HOSE (GH 781) (50"x3/8") M/M | 1 |
| 20 | | TUBE | 2 |
| 21 | | TUBE | 1 |
| 22 | | HOSE (GH 493) (23"x1") M/F | 1 |
| 23 | | HOSE (GH 781) (ADAPT. x3/8") M/F | 1 |
| 24 | | TUBE | 1 |
| 25 | | TUBE | 1 |
| 26 | | TUBE | 4 |
| 27 | | TUBE | 1 |
| 28 | | HOSE (GH 493) (50"x1") M/M | 2 |
| 29 | | PRESSURE FILTER | 2 |
| 30 | | TUBE | 1 |
| 31 | | HOSE (GH 493) (ADAPT. x1") M/F | 1 |
| 32 | | ADAPTER ELBOW SAE 1.0" | 1 |
| 33 | | SPLIT FLANGE | 1 |
| 34 | | ADAPTER ELBOW SAE 1.25" | 1 |
| 35 | | SPLIT FLANGE | 1 |
| 36 | | HOSE (GH 493) (ADAPT. x1") M/F | 1 |
| 37 | | HOSE (GH 781) (ADAPT. x1/2") M/F | 1 |
| 38 | | TUBE | 1 |
| 39 | | PISTON PUMP | 1 |
| 40 | | TUBE | 1 |
| 41 | | TUBE | 1 |
| 42 | | AUTOM. ARM VALVE | 1 |
| 43 | | ADAPTER ELBOW | 1 |
| 44 | | TUBE | 1 |
| 45 | | SPLIT FLANGE SAE 2.50" | 1 |
| 46 | | SPLIT FLANGE SAE 2.0" | 1 |
| 47 | | ADAPTER ELBOW SAE 2.0" | 1 |
| 48 | | ADAPTER ELBOW SAE 2.50" | 1 |
| 49 | | DOUBLE BOLT CLAMP | 2 |
| 50 | | HOSE (GH 781) (ADAPT. x1/2") M/F | 1 |
| 51 | | TUBE | 1 |
| 52 | | DOUBLE BOLT CLAMP | 2 |
| 53 | | 2.0" SUCTION HOSE | 1 |
| 54 | | 2.50" SUCTION HOSE | 1 |
| 55 | | TUBE | 2 |
| 56 | | ADAPTER | 1 |
| 57 | | ADAPTER ELBOW | 1 |
| 58 | | HOSE (GH 781) (45"x1-1/4") M/F | 1 |
| 59 | | ADAPTER ELBOW | 2 |
| 60 | | HOSE (GH 781) (25"x3/8") M/F | 1 |
| 61 | | ADAPTER "T" | 1 |
| 62 | | HOSE (GH 781) (25"x1/2") M/F | 1 |
| 63 | | HOSE (GH 781) (50"x3/8") M/M | 1 |
| 64 | | TUBE | 2 |
| 65 | | TUBE | 1 |
| 66 | | TUBE | 1 |
| 67 | | TUBE | 1 |
| 68 | | ADAPTER HOSE 2.0" | 1 |
| 69 | | REDUCTION | 1 |
| 70 | | OIL TANK | 1 |
| 71 | | BALL VALVE 2.0" | 1 |
| 72 | | ADAPTER HOSE 2.50" | 1 |
| 73 | | BALL VALVE 2.50" | 1 |
| 74 | | ADAPTER ELBOW M/M 2.0" | 1 |
| 75 | | FITTING M/M 2.0" | 2 |
| 76 | | ADAPTER ELBOW 2.50" | 1 |
| 77 | | ADAPTER | 2 |
| 78 | | ADAPTER ELBOW 45 Deg | 1 |
| 79 | | ADAPTER ELBOW 90 | 4 |
| 80 | | ADAPTER | 1 |
| 81 | | REDUCCION | 1 |
| 82 | | TUBE | 1 |
| 83 | | | 1 |

Fig. 7 A

| # | PART # | DESCRIPTION | QTY. |
|---|---|---|---|
| 1 | | CRUSHER PANEL CYL. | 1 |
| 2 | | ADAPTER ELBOW (90) | 2 |
| 3 | | HOSE (GH 781) (75"x3/8") M/F | 1 |
| 4 | | TUBE | 2 |
| 5 | | ADAPTER ELBOW (90) | 1 |
| 6 | | UP-DOWN CYLINDER | 1 |
| 7 | | TUBE | 1 |
| 8 | | HOSE (GH 781) (60"x3/8") M/F | 1 |
| 9 | | HOSE (GH 781) (46"x3/8") M/F-Elbow | 1 |
| 10 | | ADAPTER ELBOW (90) | 2 |
| 11 | | ADAPTER | 2 |
| 12 | | HOSE (GH 781) (44"x3/8") M/F-Elbow | 1 |
| 13 | | ADAPTER ELBOW | 2 |
| 14 | | ADAPTER | 5 |
| 15 | | ARM VALVE | 1 |
| 16 | | TUBE | 1 |
| 17 | | HOSE (GH 781) (68"x1/2") M/M | 1 |
| 18 | | TUBE | 1 |
| 19 | | HOSE (GH 781) (24"x1/2") M/M | 1 |
| 20 | | HOSE (GH 781) (25"x1/2") M/M | 1 |
| 21 | | TUBE | 1 |
| 22 | | HOSE (GH 781) (70"x1/2") M/M | 1 |
| 23 | | TUBE | 1 |
| 24 | | HOSE (GH 781) (29"x1/2") F/F | 1 |
| 25 | | TUBE | 1 |
| 26 | | TUBE | 1 |
| 27 | | HOSE (GH 781) (18"x1/2") F/F | 1 |
| 28 | | IN / OUT CYLINDER | 1 |
| 29 | | GRIPPER CYLINDER | 1 |
| 30 | | TUBE | 1 |
| 31 | | HOSE (GH 781) (60"x1/2") M/F | 1 |
| 32 | | ADAPTER ELBOW | 2 |
| 33 | | HOSE (GH 781) (62"x3/4") M/F | 1 |
| 34 | | TUBE | 1 |
| 35 | | ADAPTER | 1 |
| 36 | | HOSE (GH 781) (35"x1/2") F/F-Elbow | 1 |
| 37 | | HOSE (GH 781) (37"x1/2") F/F-Elbow | 1 |

Fig. 8 A

| # | PART # | DESCRIPTION | QTY. |
|---|---|---|---|
| 1 | | REAR DOOR CYLINDER | 2 |
| 2 | | ADAPTER ELBOW | 4 |
| 3 | | HOSE (GH 781) (18"x3/8") M/F | 4 |
| 4 | | ADAPTER "T" | 1 |
| 5 | | TUBE | 2 |
| 6 | | TUBE | 2 |
| 7 | | ADAPTER "T" | 1 |
| 8 | | TUBE | 1 |
| 9 | | HOIST CYLINDER | 2 |
| 10 | | ADAPTER | 2 |
| 11 | | HOSE (GH 781) (20"x1/2") F/F Elbow | 2 |
| 12 | | ADAPTER ELBOW | 2 |
| 13 | | TUBE | 1 |
| 14 | | TUBE | 1 |
| 15 | | FLOW CONTROL | 2 |
| 16 | | ADAPTER | 1 |
| 17 | | HOSE (GH 781) (19"x1/2") F/F Elbow | 1 |
| 18 | | ADAPTER | 1 |
| 19 | | BODY VALVE | 1 |
| 20 | | HOSE (GH 781) (29"x3/8") M/F Elbow | 2 |
| 21 | | HOSE (GH 493) (ADAPTx1.0") F/F | 1 |
| 22 | | TUBE | 1 |
| 23 | | ADAPTER "T" | 1 |
| 24 | | ADAPTER "T" | 2 |
| 25 | | HOSE (GH 781) (20"x3/8") M/F | 1 |
| 26 | | TUBE | 1 |
| 27 | | TUBE | 1 |
| 28 | | HOSE (GH 781) (22"x3/8") M/F | 1 |
| 29 | | COUNTERB. VALVE | 1 |
| 30 | | TUBE | 1 |
| 31 | | PACKER CYLINDER | 2 |
| 32 | | ADAPTER ELBOW | 2 |
| 33 | | HOSE (GH 781) (ADAPTx3/4") F/F | 2 |
| 34 | | ADAPTER ELBOW | 2 |
| 35 | | TUBE | 1 |
| 36 | | TUBE | 1 |
| 37 | | ADAPTER ELBOW | 1 |
| 38 | | TUBE | 1 |
| 39 | | HOSE (GH 781) (ADAPTx3/4") F/F | 1 |
| 40 | | TUBE | 1 |
| 41 | | ADAPTER "T" | 1 |
| 42 | | HOSE (GH 781) (ADAPTx3/4") F/F Elbow | 1 |
| 43 | | ADAPTER | 1 |
| 44 | | ADAPTER ELBOW | 2 |
| 45 | | HOSE (GH 781) (26"x3/4") F/F Elbow | 1 |
| 46 | | HOSE (GH 493) (25"x1.0") F/F | 1 |
| 47 | | ADAPTER "T" | 1 |
| 48 | | ADAPTER | 1 |
| 49 | | REGEN VALVE | 1 |
| 50 | | HOSE (GH 493) (ADAPTx1.0") F/F Elbow | 2 |
| 51 | | ADAPTER ELBOW | 1 |
| 52 | | HOSE (GH 493) (ADAPTx1.0") F/F | 2 |
| 53 | | ADAPTER ELBOW | 1 |
| 54 | | TUBE | 2 |
| 55 | | ADAPTER ELBOW | 1 |
| 56 | | TUBE | 2 |
| 57 | | ADAPTER ELBOW | 1 |
| 58 | | ADAPTER ELBOW | 2 |
| 59 | | ADAPTER | 1 |
| 60 | | ADAPTER | 1 |
| 61 | | ADAPTER | 2 |

SYSTEMS PERFORMANCE COMPARISON

| Item | Conventional System I | | Conventional System II | | SLS |
|---|---|---|---|---|---|
| | 1000 psi | 2000 psi | 1000 psi | 2000 psi | 3000 psi |
| 1 Hydraulic System | | | | | |
| System Type | Open Centered | | Open Centered | | Closed Centered |
| Pump | Gear | | Vane | | Piston |
| Pressure (Max.) | 2000 psi | | 2000 psi | | 3000 psi |
| Pump Type | Fixed Displacement | | Fixed Displacement | | Variable Displacement |
| Pump Controls | Dry Valve | | Oasis Bypass Loop, Load-sensing | | Pressure compensated, Load-sensing |
| Volumetric Efficiency (after a year in service): | | | | | |
| at 120 Deg. F. 500psi | 80-85% | | 85 - 88% | | 95-96% |
| at oper. temp.& press. | 55-60% at 180 deg.F. 2000psi | | 78-82% at 180 deg.F. and 2000psi | | 94-95% at 140 deg.F. and 3000psi |
| Flow Required at 750 rpm | 130 gpm | | 130 gpm | | 120 gpm |
| Pump theoretical flow req'd. | | | | | |
| (at 180 deg.F. Oper.Temp) | 150 gpm | | 136.5 gpm | | 121.28 gpm |
| Pump Disp. Required: | 15.4 cu. in./rev. | 116.8 cu. in./rev. | 11.27 cu. in./rev. | 8.46 cu. in./rev. | 21.05 cu. in./rev. 16.55 cu. in./rev. |
| Pump Size (Displacement) | 16.5 cu. in./rev | | 11.85 cu. in./rev | | 6.55 cu. in./rev. |
| Directional Control Valve | Uncomp. Flow, air operated pilous | | Uncomp.flow, air pilot, Load-sensing | | Press.Comp.Flow, electric pilot, Load-sensing |
| 2 Performance | | | | | |
| 1* At 750 rpm: | | | | | |
| Theoretical | 154.55 gpm | | 138.46 gpm | | 10 - 21.28 gpm |
| Actual | 132.37 gpm | | 131.54 gpm | | 10 - 20.22 gpm |
| 1* At 1200 rpm: | 130.0 gpm | | 130.0 gpm | | 10 - 20.0 gpm |
| Theoretical | 187.27 gpm | | 161.55 gpm | | 10 - 34 gpm |
| Actual | 152.35 gpm | | 150.48 gpm | | 10 - 32.56 gpm |
| 1* At 2200 rpm: | | | | | |
| Theoretical | 160 gpm | | 112.36 gpm | | 10 - 34 gpm |
| Actual | 10 gpm | | 108.0 gpm | | 10 - 34 gpm |
| 1b Back-Pressure Losses | | | | | |
| 3 Power Losses: | | | | | |
| 1a. Pump Efficiency | | | | | |
| At 750 rpm | 12.94 HP | | 14.04 HP | | 10.93 HP |
| At 1200 rpm | 120.37 HP | | 16.46 HP | | 11.17 HP |
| At 2200 rpm | 10 HP | | 10 HP | | 10 HP |
| 1b Back-Pressure Losses | | | | | |
| At 750 rpm | 100 psi | | 175 psi | | 140 psi |
| At 1200 rpm | 1250 psi | | 1200 psi | | 170 psi |
| At 2200 rpm | 10 psi | | 1500 psi | | 170 psi |
| | 13.18 HP | 112.73 HP | 11.68 HP | 17.18 HP | 10.87 HP |
| | | | | 122.92 HP | 12.24 HP 13.54 HP |
| | | | | | 1.39 HP 10HP |

SYSTEMS PERFORMANCE COMPARISON (Cont. Fig 10)

| Item | Conventional System 1 | | Conventional System 2 | | S T S System | |
|---|---|---|---|---|---|---|
| | 1000 psi | 2000 psi | 1000 psi | 2000 psi | 1500 psi | 3000 psi |
| | 7 gpn flow | 7 gpn flow | 7 gpn flow | 7 gpn flow | 4.57 gpn flow | 4.57 gpn flow |
| C. Operation Losses | | | | | | |
| One Function Operated | | | | | | |
| Low Over Relief Valve: | | | | | | |
| At 750 rpm | 25.37 gpn | 23 gpn | 24.64 gpn | 23 gpn | 0 gpn | 0 gpn |
| At 1200 rpm | 45.36 gpn | 41 gpn | 43.48 gpn | 41.02 gpn | 0 gpn | 0 gpn |
| At 2200 rpm | 0 gpn | 0 gpn | 0 gpn | 0 gpn | 0 gpn | 0 gpn |
| Power Loss: | | | | | | |
| At 750 rpm | 29.5 HP | 29.6 HP | 18.36 HP | 36.71 HP | 0 HP | 0 HP |
| At 1200 rpm | 52.93 HP | 52.93 HP | 25.37 HP | 47.86 HP | 0 HP | 0 HP |
| At 2200 rpm | 0 HP | 0 HP | 0 HP | 0 HP | 0 HP | 0 HP |
| Total Losses With one Function Working | | | | | | |
| At 750 rpm | 41.49 HP | 61.43 HP | 24.08 HP | 48.25 HP | 1.8 HP | 3.11 HP |
| At 1200 rpm | 86.03 HP | 111.48 HP | 39.01 HP | 70.84 HP | 2.56 HP | 4.93 HP |
| At 2200 rpm | 0 HP | 0 HP | 32.92 HP | 32.92 HP | 0 HP | 0 HP |
| Average Losses With Normal Duty Cycle | | | | | | |
| Power Loss, HP | 39.04 Hp | | 25.74 Hp | | 2.16 Hp | |
| Heat Generated by Losses | 99,435 Btu/Hr | | 65,550 Btu/Hr | | 5,427 Btu/Hr | |
| Fuel Wasted on Losses | 1.8 Gal./Hr | | 1.19 Gal./Hr | | 0.10 Gal./Hr | |
| For 3 hr. Operating Time | 10.8 Gal./Day | | 7.14 Gal./Day | | 0.60 Gal./Day | |
| Average Cost @ $1.50/gal. | $16.20 / Day | | $10.71 / Day | | $0.99 / Day | |
| Average Cost (250 days/year) | $4,050 /Year | | $2,678 /Year | | $225 /Year | |
| Savings / Year | $0.00 | | $1,372 | | $3,825 | |
| Savings for 7 Year Life | $0.00 | | $9,504 | | $26,775 | |

Additional Advantages:
25 % Less Maintenance
35 % Less Down Time (High System Reliability and Availability)
System Simplicity - 40 % Less Noise
Control Flexibility - Microprocessor Controlled Programmable Functions
Full Operation at Low Idle
Fast Responding Functions

HYDRAULIC CONTROL SYSTEM FOR REFUSE COLLECTION VEHICLE

RELATED PATENT APPLICATION & INCORPORATION BY REFERENCE

This application is a divisional application of U.S. utility application Ser. No. 10/850,052, filed May 20, 2004, now U.S. Pat. No. 7,070,381, which claims the benefit under 35 USC 119(e) of U.S. provisional patent application Ser. No. 60/471,944, entitled "Hydraulic Control System For Side Loading Refuse Collection Vehicle," filed May 20, 2003. These related applications are incorporated herein by reference and made a part of this application. If any conflict arises between the disclosure of the invention in this divisional application and that in the related provisional application, the disclosure in this divisional application shall govern. Moreover, the inventors incorporate herein by reference any and all U.S. patents, U.S. patent applications, and other documents cited or referred to in this application or cited or referred to in the U.S. patents and U.S. patent applications incorporated herein by reference.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF INVENTION

Refuse collection vehicles include front loading and side loading vehicles for collecting refuse in containers placed on the side of a street by home or business. Front loading refuse collection vehicles use a lifting arm mounted to move between a position above the cab of the vehicle and a position in front of the vehicle. The arm moves from the position above the cab to the position in front of the vehicle, picks up a refuse container and lifts the container over the top of the cab, dumping the container's contents into the vehicle's refuse storage body. Side loading refuse collection vehicles use a lifting arm mounted on the vehicle's chassis or the refuse storage body. In side loading refuse collection vehicles, from a start position adjacent the side of the truck refuse body, the arm is extended to reach a refuse container.

At the outer end of either the side-mounted or front-mounted lifting arm is an apparatus that, upon actuation when positioned adjacent the refuse container, holds the container during lifting and dumping of the container. A grabber mechanism is used with the side-mounted arm that grips the refuse container and a fork mechanism is used with the front-mounted lifting arm that engages the refuse container. Both the grabber and fork mechanisms typically require the holding apparatus to be moved from a non-engagement position to an engagement position.

In both type of vehicles, the arm raises the container above the refuse storage body and tilts or inverts it to dump its contents into an open hopper in the top of the vehicle's refuse storage body. The lifting arm while holding the empty refuse container is then moved downward to set the container on the street. Finally, the arm is returned to its start position. The refuse storage body includes a packer to compact the refuse inside the body and the body is mounted to be tilted by a hoist to allow collected refuse to be discharged through an open rear door from the rear of the body. The rear door is closed while the packer is being operated and is opened to discharge the compacted refuse.

Different drive mechanisms have been used to operate the lifting arm, grabber mechanism, packer, the holding apparatus, and refuse storage body, for example, hydraulic cylinders, hydraulic motors, and hydro-mechanical actuators. Most of the refuse vehicle manufacturing industry uses gear pumps to operate these drive mechanisms. Such gear pumps are fixed displacement, low volumetric efficiency devices that cannot vary the flow rate from the pump without changing speed (which cannot be changed for control of output). These pumps supply the output fluid to the open-centered directional hydraulic control valves that supply fluid to the desired functional cylinders, motors and/or actuators. As such these pumps are on-off systems where, if any function is activated, all the fluid that is not used by the function is raised to a relief pressure setting and spilled over a relief valve, converting energy into heat. At the same time the pump's enormous leakage (which increases as the pressure and/or temperature rises) generates more heat and less useful work. Even when no function is operated and the fluid just flows through a valve, high flows cause large pressure drops that result in loss of energy into heat. To save energy at higher engine revolutions, when the pump operation is not needed, devices such as "dry valve" have been used to choke off the pump's inlet to stop the pump from pumping fluid.

To increase the volumetric efficiency some manufacturers have used vane pumps. Vane pumps have a much higher volumetric efficiency and thus reduce the energy losses due to pump leakage. Nevertheless, all the other losses stay the same as in the gear pump. Another disadvantage that vane pumps have is that unlike gear pumps, the flow from cannot be cut off. The vane pump has to pump out fluid when it turns. To reduce the pressure drop that would take place when pumping all the fluid through a directional control valve, especially at higher engine/pump speeds, a by-pass valve is used that opens when a signal is supplied to it to connect the discharge of the pump to suction, thus looping the fluid. This lowers the losses comparative to pumping through the valve, but a considerable pressure drop across the bypass valve and line occurs at higher speeds and results in major energy loss. To avoid raising all the fluid to the relief valve pressure, some manufacturers have used load sensing relief valves (unloading valves) to lower the relief pressure to the functional requirement. However, this requires load sensing directional control valves or other additional components. In spite of all of these energy loss reduction efforts, the losses remain extremely high in these pump systems, resulting in very high operating temperatures (175-185° F.). This in turn results in even higher losses due to loss of viscosity, higher component wear, higher seal failures, and hydraulic fluid oxidation requiring fluid changes.

U.S. Pat. No. 6,312,209 discloses a front loading vehicle using a variable displacement piston pump supplying fluid to closed-centered valves to actuate drive mechanisms. Front loading refuse collection vehicles are simple, slow moving systems that do not require the dynamics and controls necessary for side loading vehicles. This vehicle employs directional control valves that cannot accurately and repeatably control the speed of the lifting arm, since flow in these valves cannot be precisely adjusted. The reason for this inaccuracy and non-repeatability is pneumatic activation of the direction control valves. Besides the inaccurate and non-repeatable control achieved by a compressible pneumatic media, the system air pressure is not constant and results in different lifting arm speeds at the same control setting.

SUMMARY OF INVENTION

This invention provides a refuse collection vehicle having a control system for achieving far superior results than obtained by pneumatic systems commonly used by the refuse vehicle manufacturing industry. This invention has one or more features as discussed subsequently herein. After reading the following section entitled "DETAILED DESCRIPTION OF SOME EMBODIMENTS OF THIS INVENTION," one will understand how the features of this invention provide its benefits. The benefits of this invention include, but are not limited to: (a) accurate and repeatable control of valve operations and speed of movement of drive mechanisms, in particular the accurate control of the speed of the lifting arm in a side loading or front loading refuse vehicle, (b) improved energy efficiency, (c) reduced wear of drive mechanisms, and (d) extended life of the hydraulic fluid.

Without limiting the scope of this invention as expressed by the claims that follow, some, but not necessarily all, of its features are:

One, the refuse vehicle includes a lifting arm mounted to the vehicle that moves between a lowered position and a raised position. This arm may be mounted on the side or front of the vehicle.

Two, a refuse storage body is mounted to move between a lowered position and a raised position. It has a rear door that moves between a closed position and an open position, and a packer in the refuse storage body moves between an extended and a retracted position.

Three, drive mechanisms connected to the lifting arm, refuse storage body, rear door, and packer move the arm, body, rear door, and packer between their different positions.

Four, a hydraulic valve system operates the drive mechanisms. This valve system may include a plurality of valves having spool mechanisms moveable to different positions in response to electronic actuation devices to adjust the speed and direction of movement of the drive mechanisms.

Five, sensors detect the positions of the lifting arm, refuse storage body, rear door, and packer, said sensors generating electrical signals corresponding to said positions. At least one of the sensors may continuously monitor the position of the lifting arm and generate arm position signals.

Six, an electrical/electronic control system may include electronic actuation devices that, in response to the electrical signals, operate the drive mechanisms. Also electrical/electronic control system may include a microprocessor programmed to control the movement of the spool mechanisms to adjust the speed and direction at which the drive mechanisms move. The microprocessor may include a program routine responsive to position signals, with the program routine adjusting the speed and direction of movement the drive mechanism for the arm. The routine may provide that the arm follow a predetermined motion profile so that the arm is accelerated and decelerated to minimize the cycle time. The routine may provide that the arm has a predetermined dwell time for refuse to drop out of the refuse container when the arm is in a dump position. A routine may be provided to timely and strategically place decelerations of the arm to close a refuse container lid when the container is returned to a start position. Another routine may provide for smooth starts and stops of the arm. Still another routine may provide for slowly and smoothly cushioning the stopping of the drive mechanisms at motion extremities of the drive mechanisms. Also, a program routine maybe provided for the drive mechanism for the packer to stop the packer smoothly and smoothly reverse the direction of movement of the packer. Another program routine may provide an interlocking safety feature.

Seven, the microprocessor may include a program routine that provides a regenerative feature for at least one of the operational functions of the vehicle. The regenerative feature enables hydraulic fluid to be recycled between a cap side and a rod side of one of the valves. This one valve operates the drive mechanism for the lifting arm to control the down and out motion of the lifting arm. The regenerative feature enables a valve to operate the drive mechanism for the packer. This regenerative feature is enabled upon a predetermined pressure being detected by a pressure sensor monitoring pressure at an output end of this valve.

Eight, the electrical/electronic control system may include a plurality of manually operated control devices mounted in a cab of the vehicle. At least some of the manually operated control devices are components of a control box in the cab, and at least some of the manually operated control devices include a plurality of warning lights, each light being associated with a different operational function of the vehicle.

Nine, the lifting arm may have a predetermined motion profile that is a function of shaping of an electrical control signal. This motion profile is shaped so that the up/down motions of the lifting arm are accelerated and decelerated to minimize the cycle time, allow time for refuse to drop out of the refuse container in a dump position, and provide timely and strategically placed decelerations when the container is returned to ground after dumping the refuse.

These features are not listed in any rank order nor is this list intended to be exhaustive.

DESCRIPTION OF DRAWING

Some embodiments of this invention, illustrating all its features, will now be discussed in detail. These embodiments depict the novel and non-obvious refuse vehicle of this invention as shown in the accompanying drawing, which is for illustrative purposes only. This drawing includes the following figures (Figs.), with like numerals indicating like parts:

FIG. 1A is a side elevational view of a side loading refuse vehicle of this invention with the refuse storage body in a raised position.

FIG. 1C is a side elevational view of a side loading refuse vehicle of this invention showing the position of various sensors.

FIG. 6A is a parts list for the hydraulic circuit shown in FIG. 6.

FIG. 7A is a parts list for the hydraulic circuit shown in FIG. 7.

FIG. 8A is a parts list for the hydraulic circuit shown in FIG. 8.

FIG. 10 and 10-1 are a table comparing the operational characteristics of the hydraulic circuits depicted in FIG. 9.

FIG. 10A is a schematic diagram of the electrical/electronic control system used with the vehicle shown in FIGS. 1A and 1B.

DETAILED DESCRIPTION OF SOME EMBODIMENTS OF THIS INVENTION

Side Loader

Figure 1B:
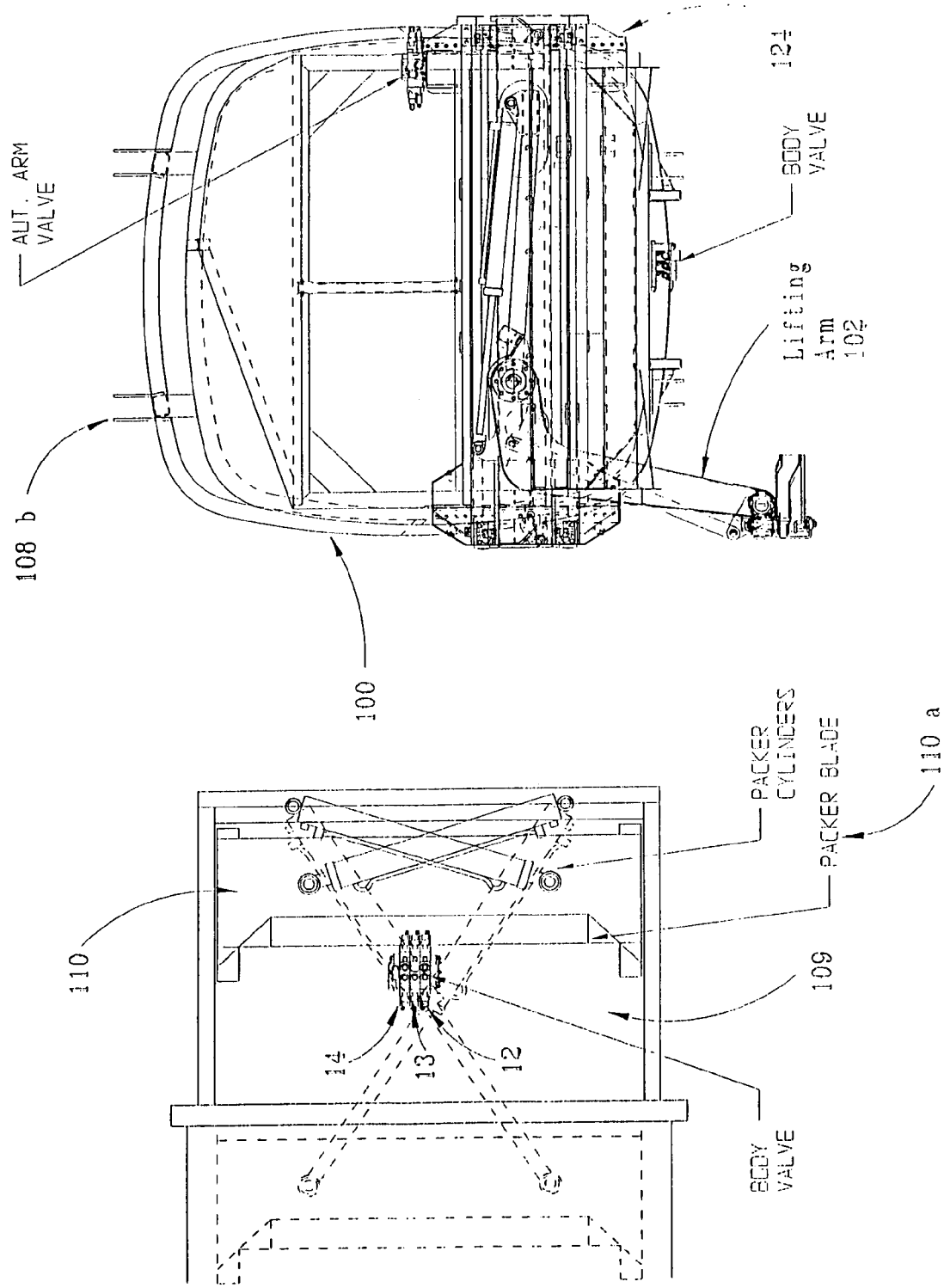
FIG. 1B is a fragmentary top view of the side loading refuse vehicle shown in FIG. 1A with its lifting arm rotated 90 degrees.
Figure 2:
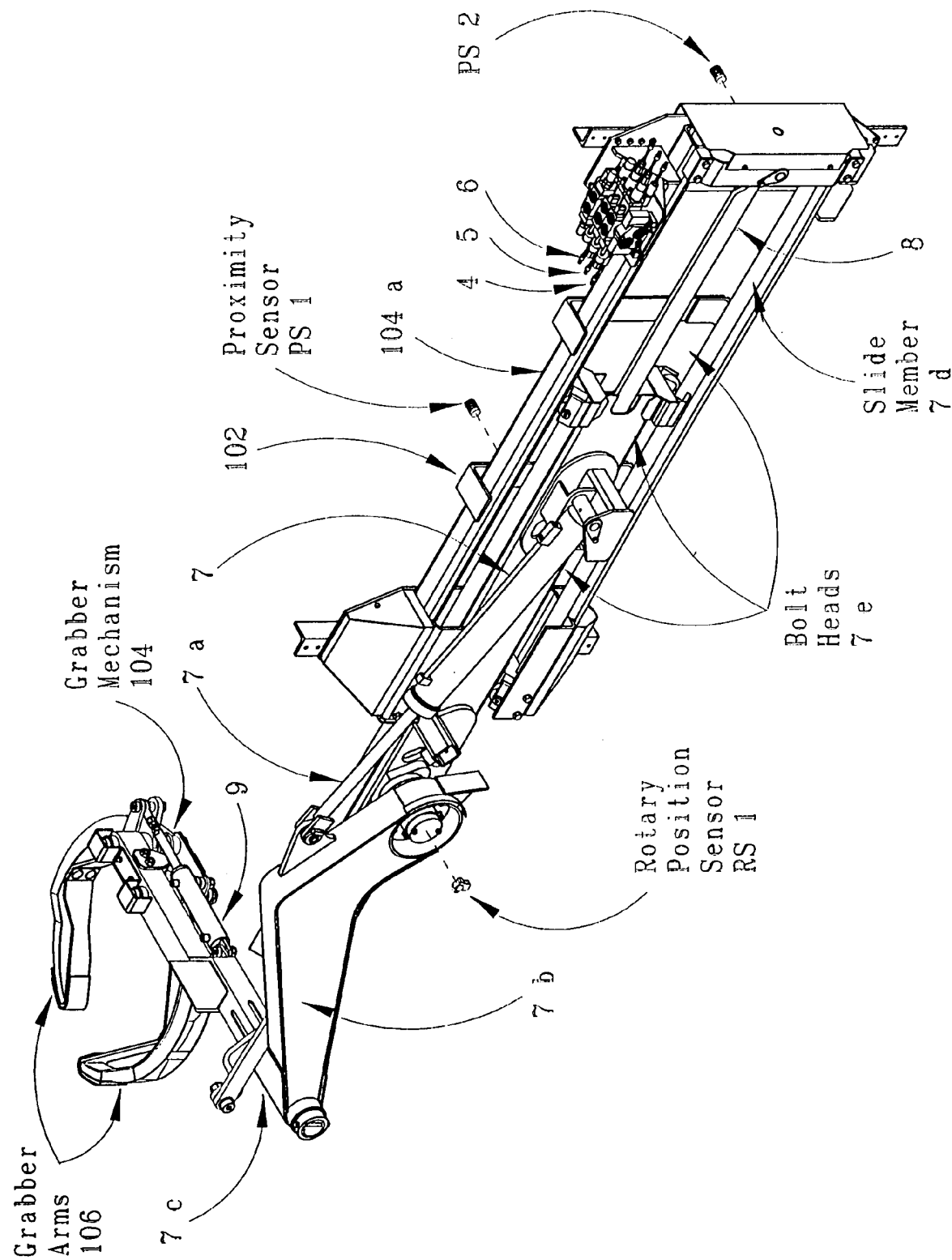
FIG. 2 is a perspective view of the lifting arm used in the side loading refuse vehicle shown in FIG. 1A.

As illustrated in FIGS. 1A, 1B and 2, a side loading refuse vehicle 100 of this invention includes a lifting arm 102 mounted on a side of the vehicle 100. The arm 102 has a grabber mechanism 104 (FIG. 2) that includes a pair of opposed grabber arms 106 that are moved towards and away from each other to grip a refuse container (not shown) in a position on the ground. The lifting arm 102 is moved from a start position adjacent the side of the vehicle 100 to grip the refuse container, lift it over an open top of a refuse storage body 108, inverting the container to dump its contents through an open hopper 109 into the refuse storage body 108, returning the container to its position on the ground, and finally back to its starting position. The refuse storage body 108 includes a packer 110 (FIGS. 1B and 4) actuated by a cylinder 15. The packer 110 includes a packer blade 110a that, upon actuation of the packer, pushes refuse towards a rear door 112 to compact the refuse. As shown in FIG. 1A, the compacted refuse is discharged from the vehicle 100 upon opening of the rear door 112 and the refuse storage body 108 being tilted by a hoist 108a.

As best illustrated in FIG. 2, the lifting arm 102 includes a bracket 104a carrying a hydraulic cylinder 7 having its rod 7a attached to an inverted V-shaped arm 7b that is pivotably mounted at its proximal end to the bracket 104a. The distal end of the inverted V-shaped arm 7b has a bracket 7c carrying a hydraulic cylinder 9 that actuates the grabber arms 106. A hydraulic cylinder 8 mounted at an inner end of the bracket 104a has its rod connected to a slider member 7d mounted to the bracket 104a to move in and out. The hydraulic cylinder 7 and V-shaped arm 7b are carried by slider member 7d and move in and out therewith. A rotary position sensor RS1 continuously monitors the position of the inverted V-shaped arm 7b to detect the Up/Down position of the lifting arm 104.

A series of spaced apart bolt heads 7e along an inner side of the slider member 7d are used, along with a proximity sensor PS1, to monitor the In and Out positions of the lifting arm 104.

Figure 3:
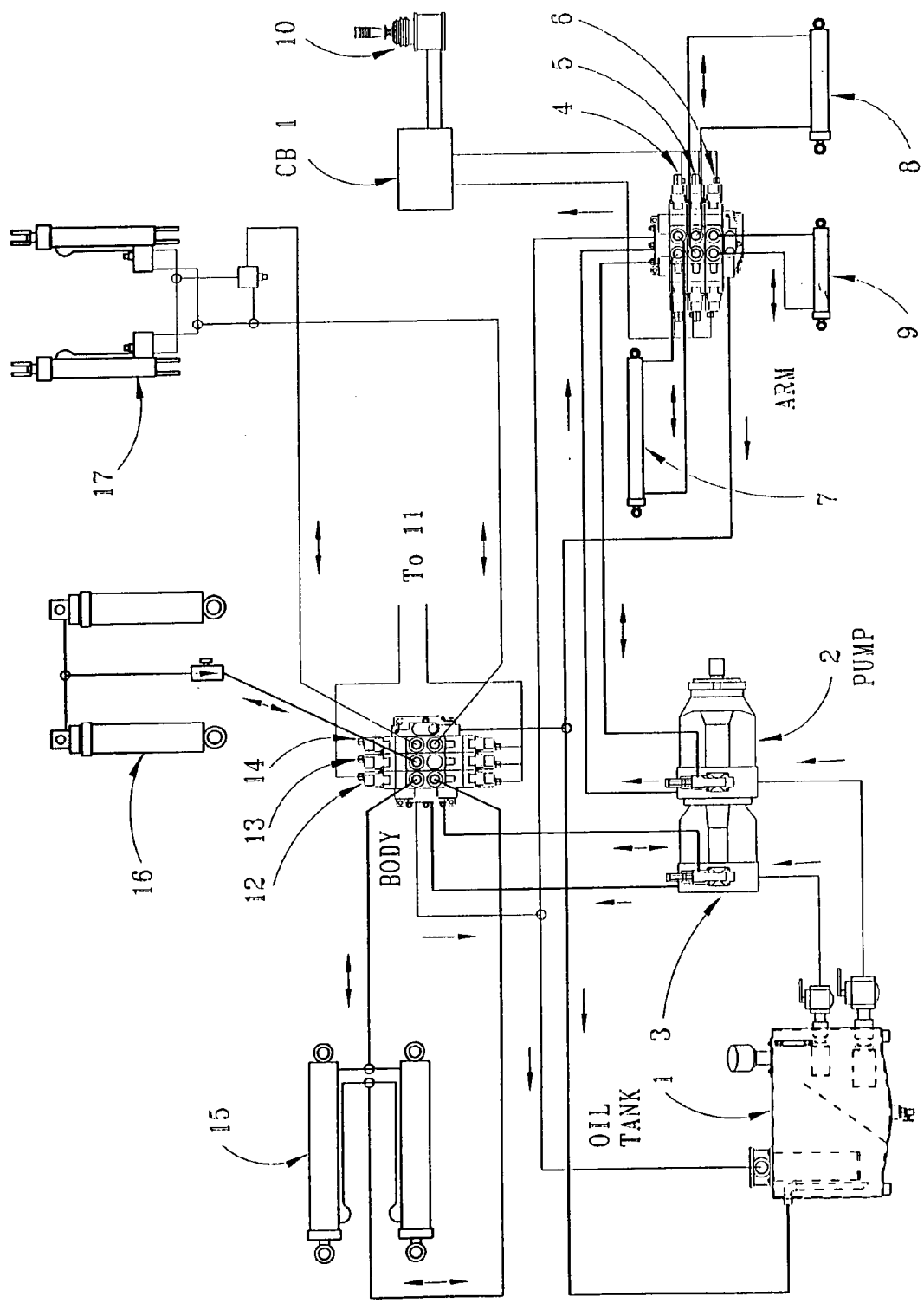
FIG. 3 is a simplified schematic diagram of the hydraulic system for the side loading refuse vehicle shown in FIG. 1A.

In accordance with this embodiment of the invention, two positive displacement pumps 2 and 3 mounted in front of the cab 124 (FIG. 1A) are employed in the hydraulic circuit depicted in FIG. 3. The pump 3, with an associated first valve system including spool valves 12, 13, and 14, is in fluid communication with the hydraulic cylinders 15, 16, and 17 that respectively operate the packer 110, the hoist 108a, and the rear door 112. The pump 2, with an associated second valve system including spool valves 4, 5, and 6, is in fluid communication with hydraulic cylinders 7, 8, and 9 that operate the lifting arm 102. The spool valves 4, 5, and 6 are mounted on the inner end of the bracket 104a.

The spool valves 4, 5, 6, 12, 13, and 14 are each conventional closed-centered, pressure compensated valves. These spool valves 4, 5, 6, 12, 13, and 14 each include a spool mechanism SM having a pressure compensator PC to maintain a constant flow rate of fluid through the valve regardless of differential in pressure across the valve for any given position of the spool mechanism. The highest load pressure amongst the valves 4, 5, 6, and amongst the valves 12, 13, and 14 is hydraulically sensed automatically to adjust the pressure compensator PC to that pressure plus a predetermined additional amount of the operative pump 2 or 3, as the case may be. Additionally, the pressure compensated flow through each closed-centered valve is maintained at a constant flow of hydraulic fluid (cylinder speed) regardless of pressures. The drive cylinder 15 for the packer 110 may also be controlled so that the packer smoothly stops and smoothly reverses direction through electronic shaping of a control signal in accordance with a program routine of a microprocessor MP1 (FIG. 10A).

As illustrated in FIG. 10A, the speed and direction of movement of the spool mechanisms SM are controlled directly by an electrical/electronic control system CS1. This electrical/electronic control system CS1, in addition to the programmable microprocessor MP1, includes solenoids SOL1, SOL2, SOL3, SOL4, SOL5, SOL6, SOL7, SOL8, SOL9, SOL10, SOL11, and SOL12. These solenoids SOL1, SOL2, SOL3, SOL4, SOL5, SOL6, SOL7, SOL8, SOL9, SOL10, SOL11, and SOL12, upon being energized, move a selected spool mechanisms SM without the use of an external drive media such as pressurized air. The electrical/electronic control system CS1 controls the speed and direction of movement of a selected valve spool mechanism SM in response to the vehicle's operator actuating a manually operated control device (switches, joystick, etc.). The programmable microprocessor MP1 is programmed in accordance with conventional programming procedures.

The lifting arm 102 may have an automatic mode of operation and a manual mode of operation that allows the vehicle's operator to manually control the speed and direction of movement of the arm. In the automatic mode, the lifting arm 102 has a predetermined motion profile that is a function of shaping an electrical control signal by a routine of the microprocessor's program. In an automatic mode, the Up/Down and In/Out motions of the lifting arm 102 follow the predetermined motion profile. In a manual mode, the position of a joystick 10 (FIG. 10A) in the vehicle cab 124 determines the speed and direction of the arm movement. The microprocessor MP1 may have a program routine that provides a smooth, electro-hydraulically ramping up and stopping of the arm's drive cylinders 7, 8 and 9 to cushion starts and stops whether in the automatic or manual mode.

Figure 4:
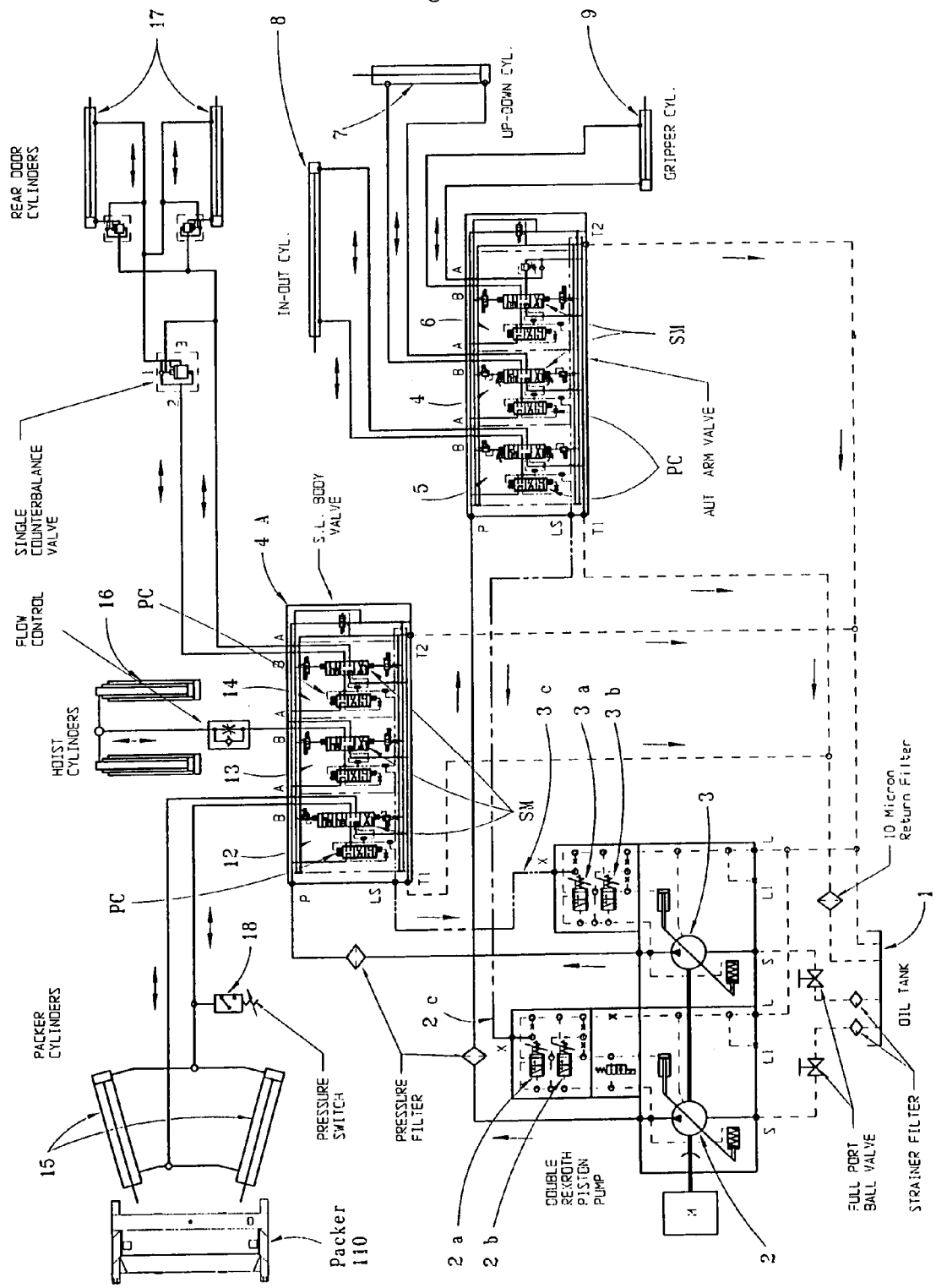
FIG. 4 is a detailed schematic diagram of the hydraulic system for the side loading refuse vehicle shown in FIG. 1A.

Referring to FIGS. 3 and 4, the pump 2, a variable displacement, pressure compensated, load-sensing piston pump, draws fluid from a reservoir 1 through a suction strainer (not shown) and an isolation valve (not shown) and pumps it to the second valve system comprising the three closed-centered, pressure compensated load-sensing valves 4, 5, and 6. The valve 4 supplies the fluid to Up/Down hydraulic cylinder 7 when energized upon receiving a control signal generated using a two-axis joystick 10 (or a proportional switch or similar manually operable control member) in the cab 124 of the vehicle 100. As discussed in greater detail subsequently, a control box CB1 in the cab 124 and the joystick 10 allows a vehicle operator to control the position of the lifting arm 104, grabber mechanism 104, refuse storage body 108, rear door 112, and packer 110. The speed and direction of movement of the cylinder 7 is controlled by the hydraulic flow supplied to it, which in turn is controlled by the movement of the spool mechanism SP in its control valve as regulated by the operation of the joystick 10. This speed and direction of movement is only governed by the hydraulic flow and is not affected by the pressure differential between the fluid supplied by the pump 2 and the pressure required by the load.

The valve 5 operates the cylinder 8 that moves the lifting arm 102 In and Out using similar control as the valve 4 using a separate or the $2^{nd}$ axis of the same joystick 10, yielding complete and precise control of the In and Out movement of the arm. Conditioning the supplied signal to the valves to control movement provides the ability to accelerate/decelerate and stop the arm smoothly and provide the motion control needed to incorporate motions that would close the lids when the empty refuse container is rapidly brought down from the dump position in the automatic mode. It also allows the use of a microprocessor MP1 (FIG. 10A) to program in automatic functions, interlocks, and safeties not possible with any other system without the use of extraneous devices. These extraneous devices increase system complexity and cost and reduce reliability and availability of the system. The valve 6 operates the Open/Close function of the arms 106 that grab the refuse container by supplying fluid to the cylinder 9 via the valve 6 with its pressure compensator PC adjusted to set the pressure of the grabber arms 106 to achieve a grabbing pressure that does not damage the container. The arm 102 then lifts the container to dump its contents into the refuse storage body 108.

The fluid supplied by the pumps 2 and 3 is totally controlled by what the system requires at that time. When none of the functions are operated, no flow is produced by the pumps 2 or 3 (the pump going to almost zero displacement). When a function is energized, the flow produced by the pump 2 or 3 would be what would be required as set by its associated valve. The pump 2 and 3 are equipped with dual pressure compensators 2a and 2b and 3a and 3b, respectively, for setting a predetermined maximum pressure for the valve system to which they are respectively connected, The compensators 2a and 2b ensure that the hydraulic system including the valves 4-6 never exceeds, for example, 200-300 psi (a standby pressure above what the system requires), sensing pressure in a load-sensing hydraulic line 2c. The compensators 3a and 3b ensure that the hydraulic system including the valves 12-14 never exceeds, for example, 3000 psi, sensing pressure in a load-sensing hydraulic line 3c. This virtually eliminates or dramatically reduces, the losses encountered in the other hydraulic systems. In addition, the very high volumetric efficiency (in the mid-nineties) reduces losses due to leakage. Both of these result in the system running very cool, approximately 40 degrees F. cooler than the conventional systems.

To operate the refuse storage body functions (the packer 110 operation, the hoist 108a to lower and raise the refuse storage body 108, and the rear door 112), the pump 3 is used to supply the on-demand fluid. The pump 3 is also a variable displacement, pressure compensated, load sensing piston pump that supplies the fluid to a closed-centered, pressure-compensated, bank of directional control valves 12, 13, and 14. The pump 3 may be mounted in tandem with pump 2 as shown in FIG. 3, or separately. The valve 12 operates the packer cylinders 15, the valve 13 operates the hoist cylinders 16, and the valve 14 operates the rear door cylinders 17. These pressure compensated valves 12-14 allow a preset maximum speed of each drive cylinder.

As shown in FIG. 10A, the electrical/electronic control system CS1 includes the programmable microprocessor MP1, control box CB1, rotary position sensor RS1, joystick 10, and solenoids SOL1, SOL2, SOL3, SOL4, SOL5, SOL6, SOL7, SOL8, SOL9, SOL10, SOL11, and SOL12. In addition, the electrical/electronic control system CS1 includes proximity sensors PS1, PS2, PS3, PS4, PS5, and PS6 for detecting the movement of the lifting arm 104, grabber mechanism 104, refuse storage body 108, rear door 112, and packer 110. The proximity sensor PS1 is located adjacent on the bracket 104a as shown in FIG. 2. The proximity sensor PS2 is located on the bracket 104a inward of the sensor PS1 as shown in FIG. 2. The proximity sensor PS3 is located inside the refuse storage body 108 near the cab 124. The proximity sensor PS4 is located nearby sensor PS3 as shown in FIG. 1C. The proximity sensor PS5 is near a hinge for the rear door 112. The proximity sensor PS6 is located beneath the refuse storage body 108 along a refuse storage body support structure 108b as shown in FIG. 1A.

The proximity sensors PS1, PS2, PS3, PS4, PS5, and PS6 generate signals that are processed by the microprocessor MP1 in accordance with its program to energize the solenoids SOL1, SOL2, SOL3, SOL4, SOL5, SOL6, SOL7, SOL8, SOL9, SOL10, SOL11, and SOL12. When energized the solenoid SOL1, by moving the spool mechanism SM of the associated valve 12 that controls the operation of the packer hydraulic cylinder 15, extends the packer blade 110a. When energized the solenoid SOL2, by moving the spool mechanism SM of the valve 12 in the opposite direction, retracts the packer blade 110a. When energized the solenoid SOL3, by moving the spool mechanism SM of the associated valve 14 that controls the operation of the rear door hydraulic cylinder 17, closes the rear door 112. When energized the solenoid SOL4, by moving the spool mechanism SM of the valve 14 in the opposite direction, closes the rear door 112. When energized the solenoid SOL5, by moving the spool mechanism SM of the associated valve 13 that controls the operation of the refuse storage body hoist hydraulic cylinder 16, lowers the refuse storage body 108. When energized the solenoid SOL6, by moving the spool mechanism SM of the valve 13 in the opposite direction, raises the refuse storage body 108.

When energized the solenoid SOL7, by moving the spool mechanism SM of the associated valve 4 that controls the operation of the lifting arm up/down hydraulic cylinder 7, raises the lifting arm 104. When energized the solenoid SOL8, by moving the spool mechanism SM of the valve 4 in the opposite direction, lowers the lifting arm 104. When energized the solenoid SOL9, by moving the spool mechanism SM of the associated valve 5 that controls the in/out operation of the lifting arm hydraulic cylinder 8, retracts the lifting arm 104. When energized the solenoid SOL10, by moving the spool mechanism SM of the valve 5 in the opposite direction, extends the lifting arm 104. When energized the solenoid SOL11, by moving the spool mechanism SM of the associated valve 6 that controls the operation of the grabber arms hydraulic cylinder 9, opens the grabber arms 106. When energized, the solenoid SOL12 by moving the spool mechanism SM of the associated valve 6 in the opposite direction, closes the grabber arms 106.

The control box CB1 has a toggle switch TS1 for activating the up and down position of the refuse storage body 108, a toggle switch TS2 for activating the open and closed position of the rear door 112, a toggle switch TS3 for enabling the control box CB1, and a toggle switch TS4 for enabling the joystick 10. This control box CB1 has a push button 150 that the vehicle operator presses to activate an automatic operational mode for the packer 110, which may have one or more cycles. A rocker switch 152 on the control box CB1 allows the vehicle operator to manually control the operation of the packer 110. An emergency stop button 154 is also provided. Conventional electrical connectors CON connect together the electrical lead lines and components of the electrical/electronic control system CS1.

Figure 4A:
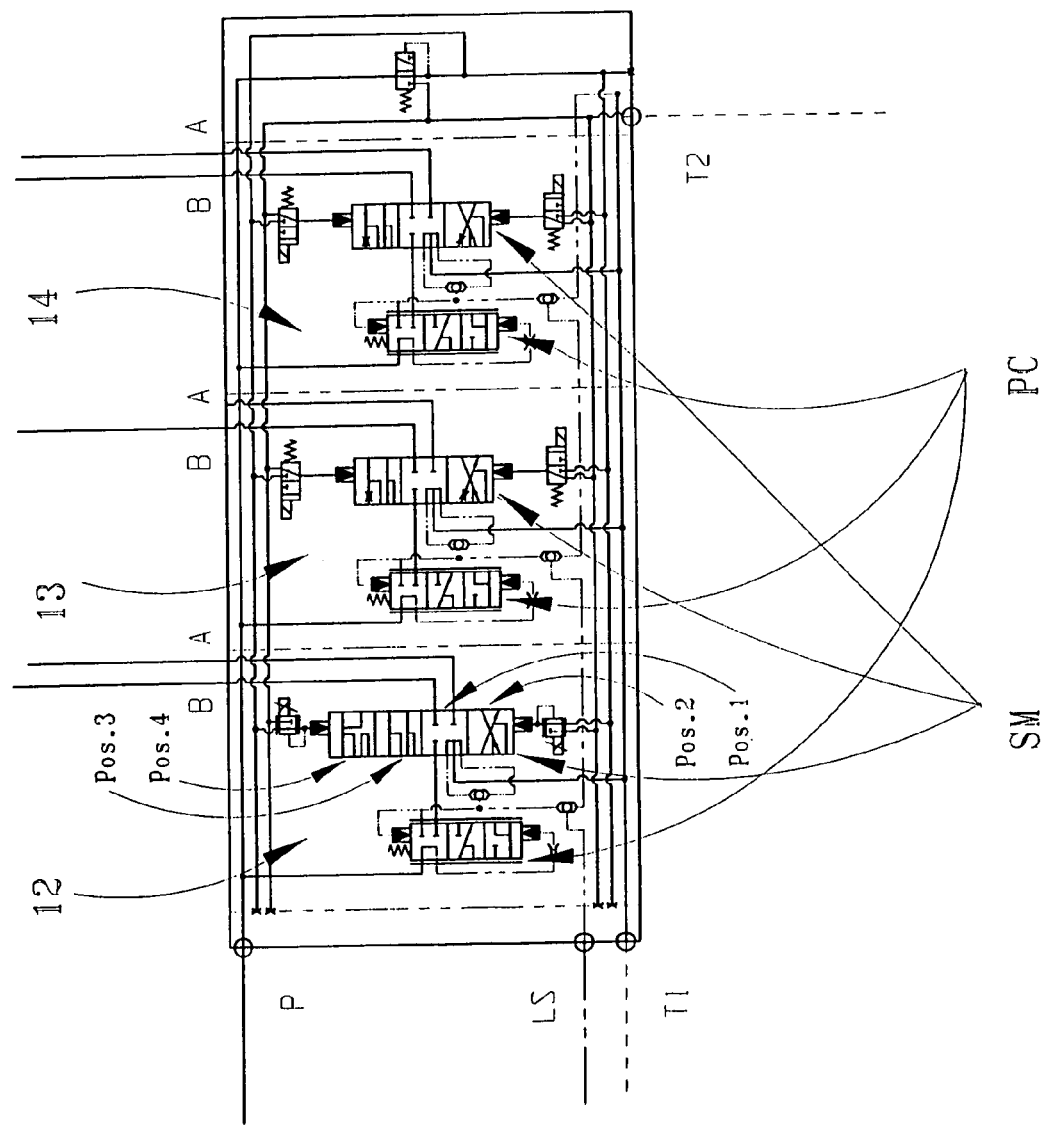
FIG. 4A is an enlarged fragmentary view taken along line 4A of FIG. 4.
Figure 5:
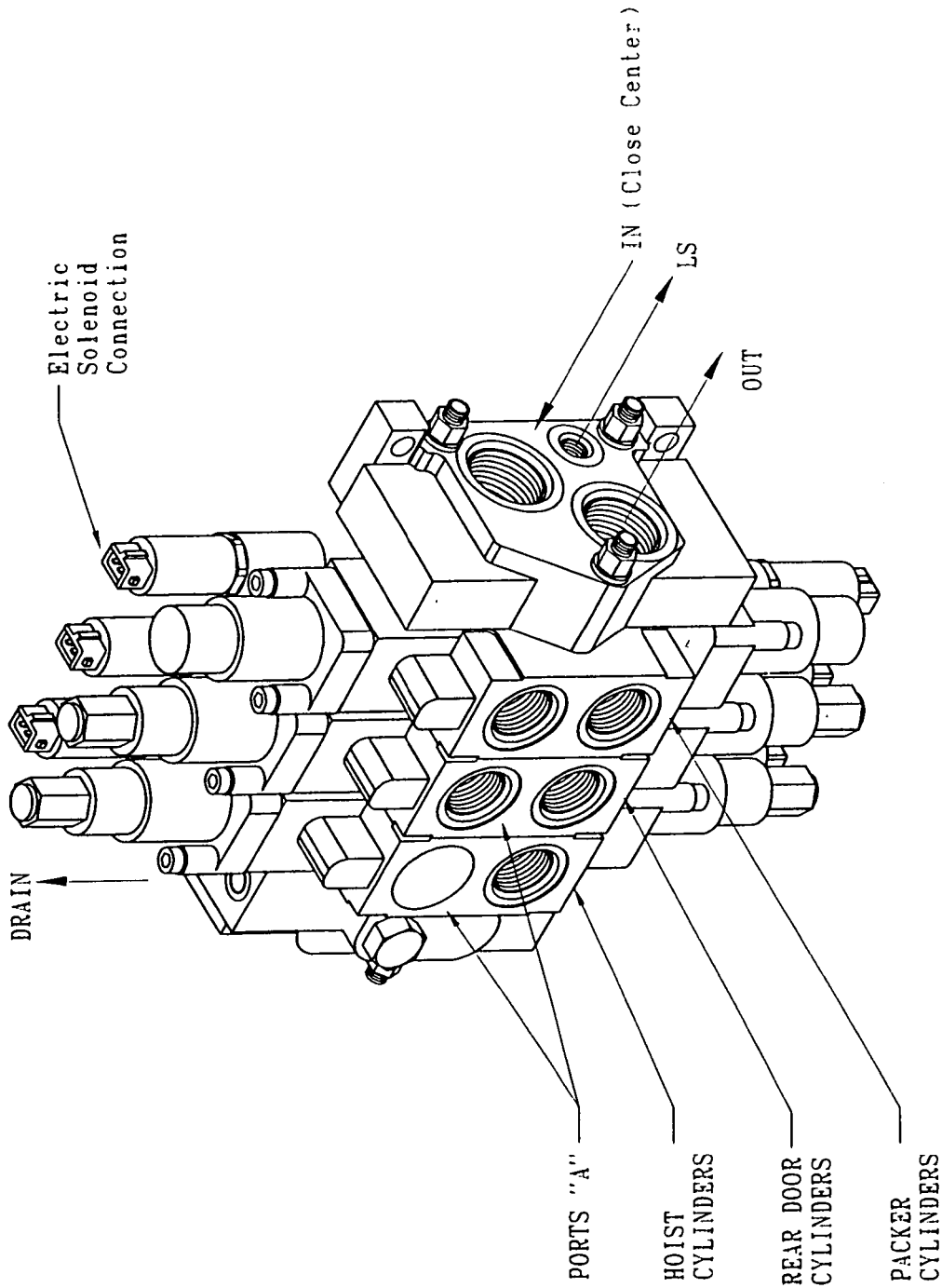
FIG. 5 is a perspective view of a valve system in fluid communication with a drive mechanism that operates the packer, rear door opener, and the hoist for the refuse storage body of the side loading refuse vehicle shown in FIG. 1A.
Figure 6:
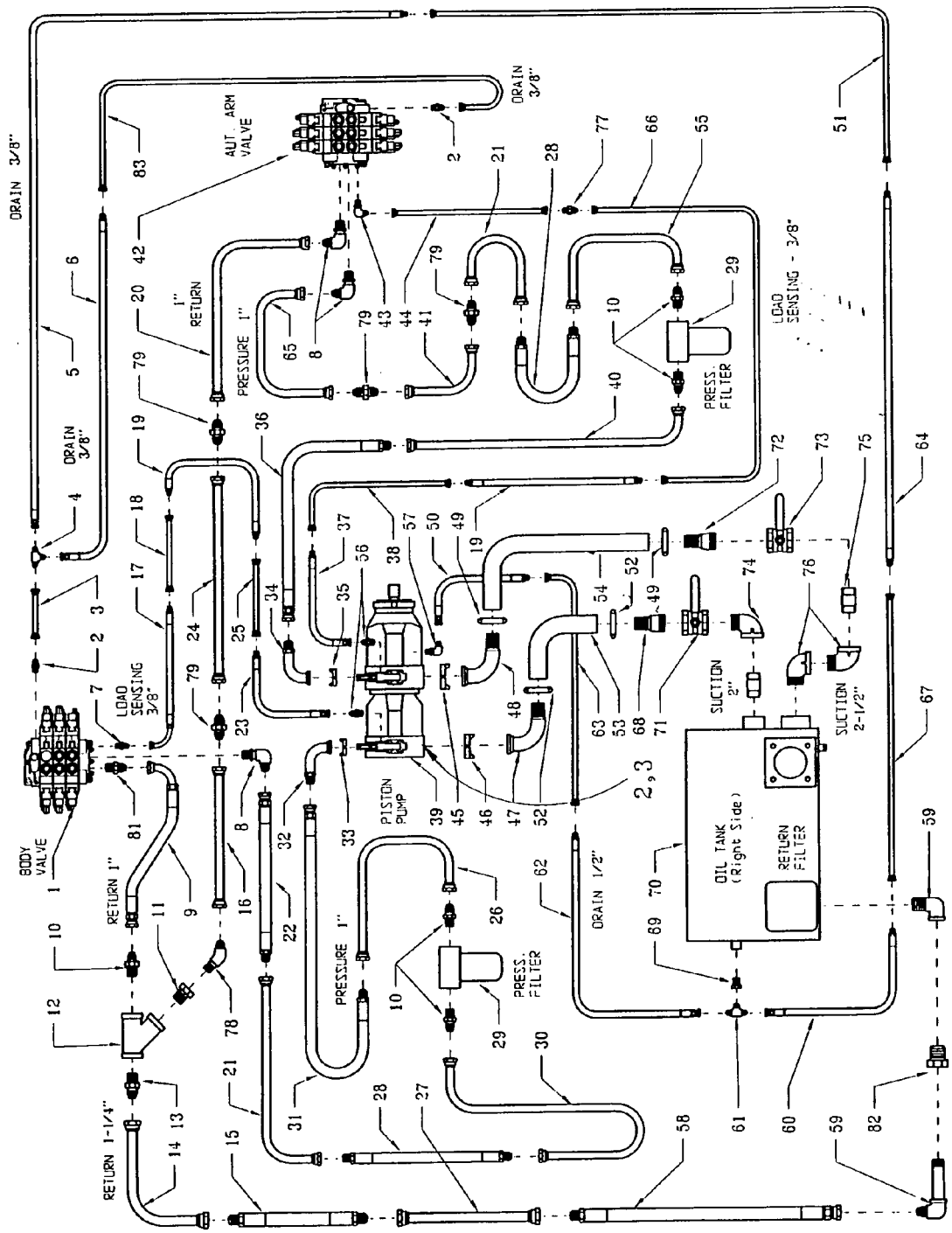
FIG. 6 is an exploded view of the hydraulic system for the side loading refuse vehicle shown in FIG. 1A.
Figure 7:
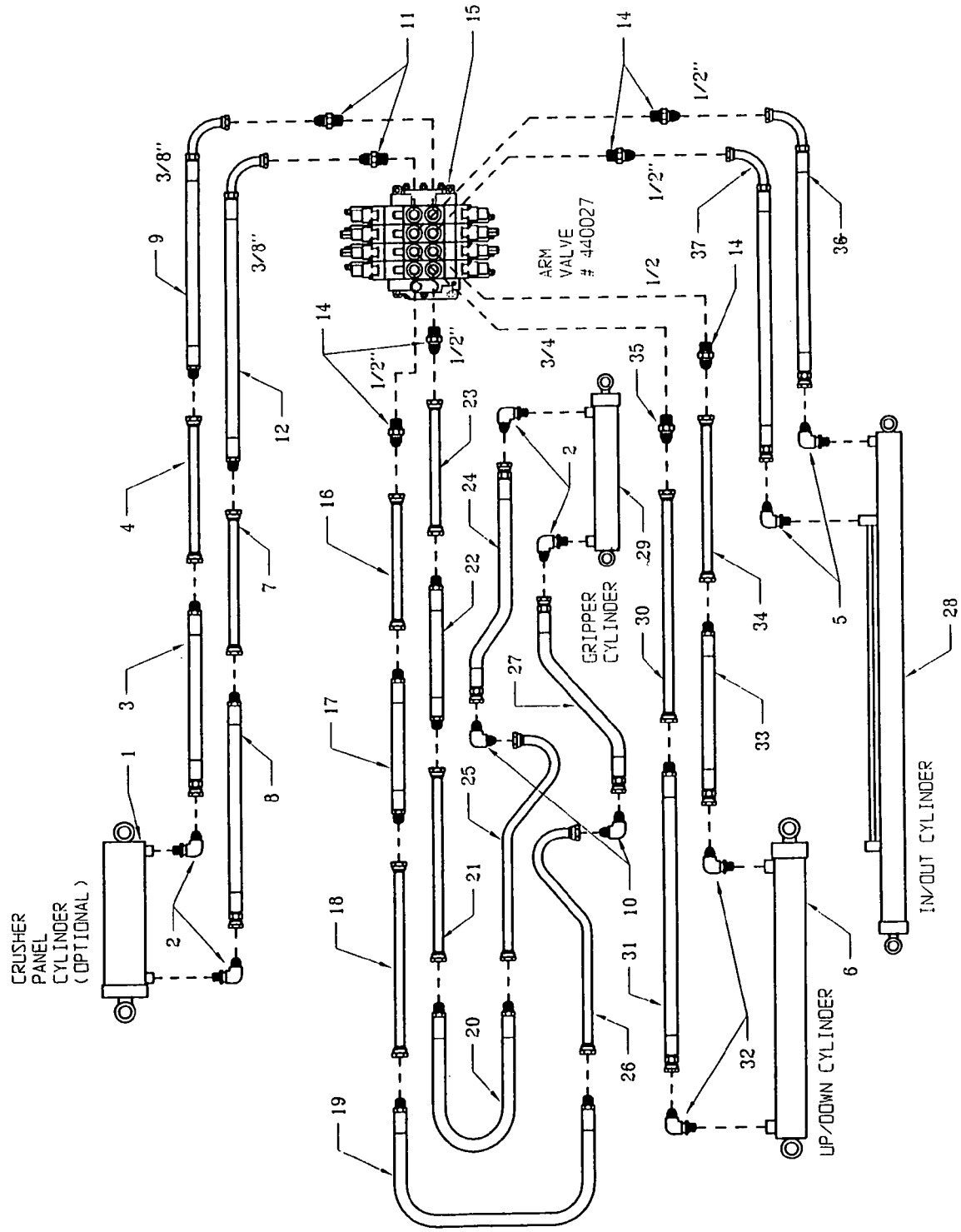
FIG. 7 is an exploded view of the hydraulic system for the lifting arm of the side loading refuse vehicle shown in FIG. 1A.
Figure 8:
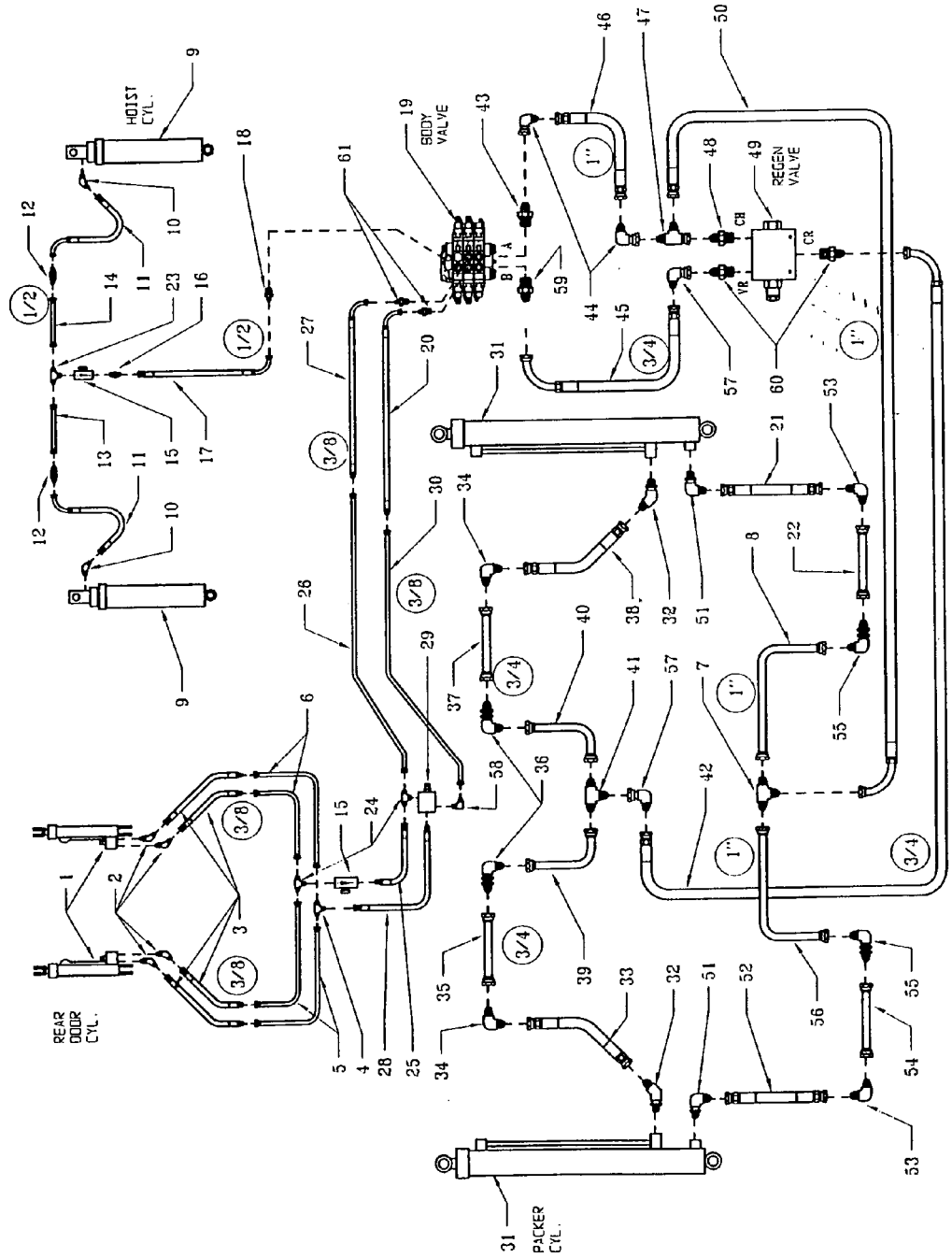
FIG. 8 is an exploded view of the hydraulic system for the packer, the rear door, and the hoist of the side loading refuse vehicle shown in FIG. 1A.

To reduce flow requirements and reduce cycle times, another program routine may provide a regenerative feature for the Extend motion of the packer 110 during compacting refuse and a regenerative feature for the Down and Out motions of the lifting arm 102. The regenerative feature simply means that the hydraulic system is enabled to recycle hydraulic fluid between a cap side and a rod side of one of pistons (not shown), for example, the valve 12 in FIG. 4A.

For the packer regenerative feature, the spool mechanism SP1 of valve 12 has a plurality of position, pos. 1, pos. 2, pos. 3, and pos. 4. Initially, the spool mechanism SP1 is in a position where the packer drive cylinders 15 generate a relative low pressure. A pressure sensor 18 (FIG. 4) detects a predetermined elevated pressure as the packer 110 gradually increases its pressure as the refuse collects in the refuse storage body 108. The pressure sensor 18 provides an electronic signal for fluid to be recycled. In pos. 1 the spool mechanism SP1 blocks all the valve's ports. Pos. 2 is the retract position where fluid is supplied to the rod side of the packer cylinders 15 to retract the packer 110. Pos. 3 is a regenerative configuration of the spool mechanism SP1 in that the pump pressure is connected to both the rod and the cap side of the cylinder to extend the cylinder.

This regenerative feature reduces the flow requirement from the pump 3, dramatically reducing the cycle time and saving energy. Since the initial travel of the blade 110a of the packer 110, and until the refuse storage body has been packed with refuse, does not require the high compaction forces, this feature saves considerable energy and reduces pump size requirements. In one embodiment of this invention, the pressure sensor 18 is set at 2800 psi, and closes when the pressure in the cap side reaches this pressure. The sensor then supplies a signal and the program routine lowers the voltage to the solenoid SOL1 that control the operation of the packer in its extended position, moving the directional control spool mechanism SP1 of the valve 12 to the position pos. 4. This allows the full force of the cylinders 15 to come into play to compact the refuse in the refuse storage body 108 for higher payloads.

In a similar manner the lifting arm 102 may uses a regenerative feature. No sensor is required, however. The regenerative feature for the lifting arm 102 is operative only when the arm moves down and out when lower pressures are needed. Both the down direction of the Up/Down cylinder 7 and out of the In/Out cylinder 8 use "regenerative" directional control spool mechanisms of these valves. This regenerative feature reduces the demand on pump fluid supply dramatically reducing it to the rod volume only rather than the high fluid volume required to supply the cap side of the cylinder. The resulting loss of force in both cases has no effect on performance since very little force is required in this mode of the cylinder movement. The use of the regenerative feature increases the arm speed and dramatically reduces pump flow requirement and thus the pump size.

The microprocessor MP1 may be programmed to include at least one routine that provides an interlocking safety feature to thereby avoid the use of external pneumatic mechanisms and valves. For example, a sensor PS—detects when the refuse storage body 108 has been titled upward. The program routine in this case would, in response to the sensor PS—detecting this condition, prevent the packer 110 from operating.

Another program routine provides for the drive cylinders 15 for the packer 110 to stop smoothly and smoothly reverse direction of movement.

Another program routine provides for direct control of a valve to allow manual control for motion modification where required, such as in the packer 110 where the packer is decelerated to a stop and reversed in direction without the use of external "Deceleration Valves" used by some prior art vehicles to avoid hard stops.

Figure 9:
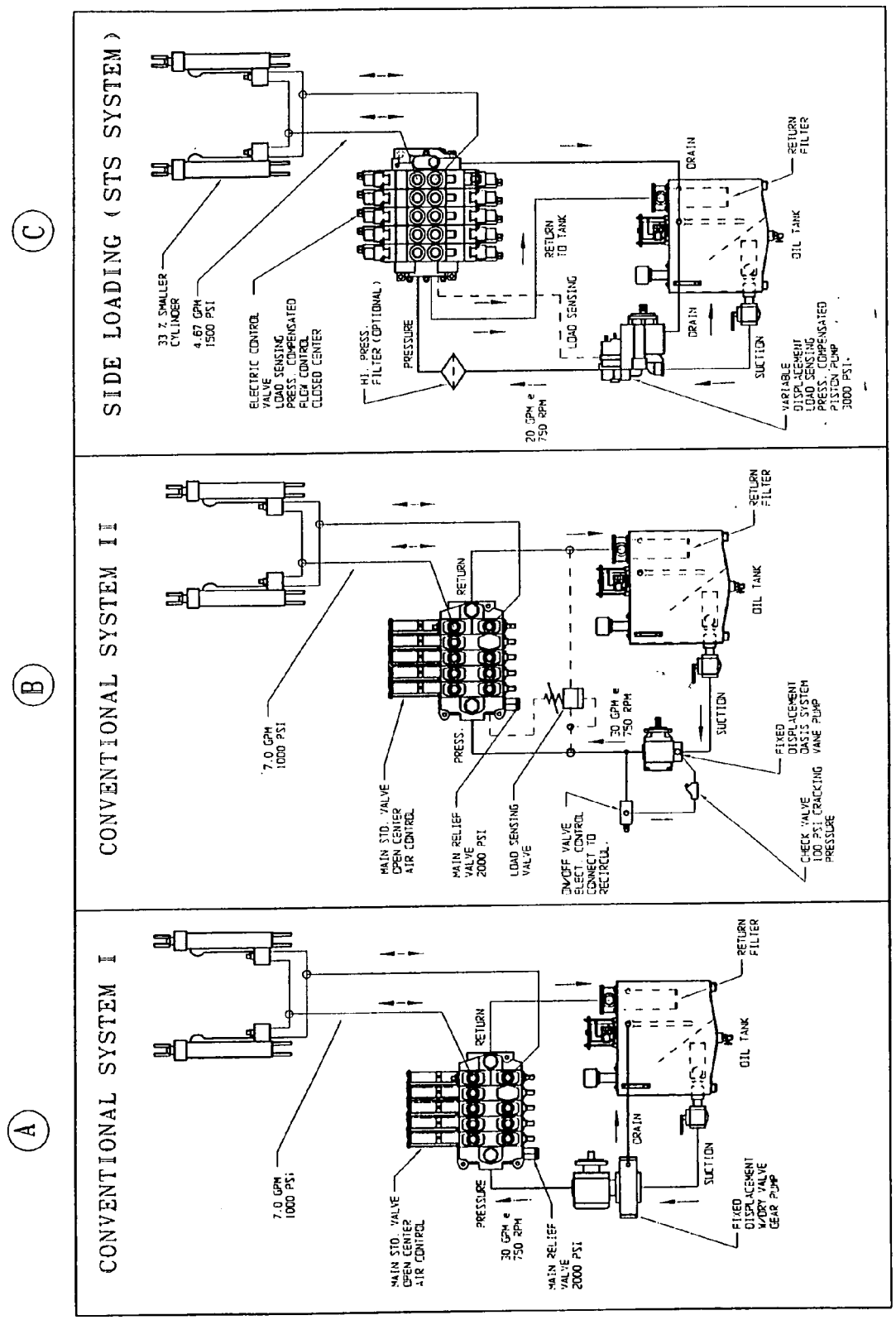
FIG. 9 is a schematic diagram of the hydraulic systems for a conventional system I, a conventional system II, and the side loading hydraulic circuit of this invention.
Figure 10:
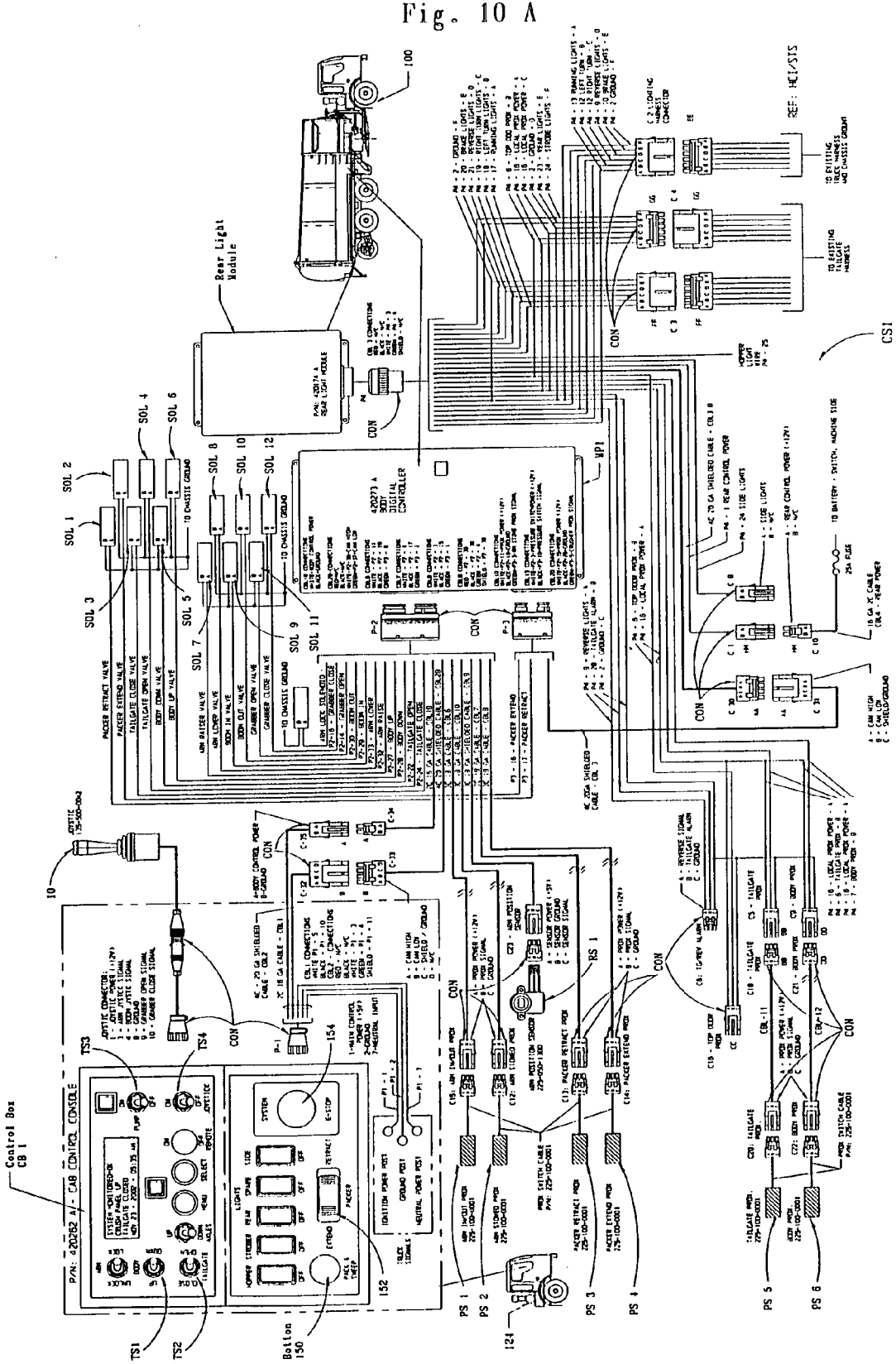

FIGS. 9 and 10 compares two conventional systems (conventional gear pump system I and conventional vane pump system II) with the hydraulic control system of the present invention discussed above. Referring to FIG. 9, the first column A shows a conventional gear pump with a dry valve. The center column B shows a vane pump with load-sensing control, and the third column C shows high pressure, pressure-compensated, load sensing piston pump system with pressure compensated flow control directional valves of the present invention. Since the normal vane pump systems are not load-sensing, only the right column of the vane pump applies. This also means that the fuel losses of this system will be considerably higher than shown on the chart. Please note the comparative losses and fuel saving with our system compared to the gear and the vane pump systems. The very fact that to-date, even in 110° F. ambient temperatures, the system temperature of this invention, with a 45 gallon reservoir, has never exceeded 142° F., is a testimony to the efficiency of this invention and longevity of the hydraulic components it produces. In addition to all that, the very complex and expensive hydraulic plumbing that the vane pump system requires, in addition to more expensive Viton seals, is a lot more than the difference in price of the two pumps, and replacing the vane pump requires considerable amount of more labor than the piston pump with its one suction, one supply and one small load-sense line and no electrical connections.

The operating figures have repeatedly indicated that both the conventional systems I and II operate at temperatures of 180 to 185 degrees Fahrenheit. This is the temperature at which the lubricity and viscosity go down dramatically, increasing system leakage (which translates into lower volumetric efficiencies and higher heat generation). Couple to that fact is the cost of hydraulic fluid replacement, higher failure rate of other components, such as valves and cylinders due to excessive temperatures, not to speak of its higher fuel consumption. Compared to that the lower prices of the gear or vane pumps become inconsequential.

Whereas the vane pump offers a higher volumetric efficiency than gear pump, it suffers from the problem of not being able to stop the flow through the pump that is directly proportional to the engine speed. All the flow has to go through the valves creating a very high pressure drop, which is synonymous with power loss and heat generation, until the pump is cut out at higher speeds by an Oasis card. At highway speeds at 2200 rpm, the arm pump and the packer pump produce very high flows that try to loop around from the discharge sides to the suction side of the pump creating not only a high pressure drops but also the turbulence that entrains air and causes cavitation in the pump, causing pump port plate erosion and pump failure. Additionally with a 60-gallon hydraulic reservoir, even at system operational speeds with a flow of approximately 80 gpm, the residence time of the fluid in the hydraulic tank is only 45 seconds, whereas hydraulic systems require approximately 2 minutes of residence time to purge the entrained air from the hydraulic fluid. This air in the system not only causes noise, it also shortens the pump and all hydraulic components life. Additionally, due to these inefficiencies, this system runs at 180 degree Fahrenheit. At this temperature the hydraulic fluid begins to oxidize and deplete the anti-wear zinc additives thus requiring frequent fluid changes if the system life is to be maintained. Secondly, at this temperature the normally 10 W hydraulic fluid has a viscosity of less than kerosene reducing the volumetric efficiency dramatically. Since Denison vane pumps do not have pressure-balanced port plates the gap between the sides and the vane blades increases causing even higher leakage.

The gear pumps fare far worse where the volumetric efficiencies are very low to start with and worsen rapidly to yield higher efficiency losses than the vane pump. Whereas a dry valve can be used to stop the high flow at higher speeds, the high leakage at relief pressures, all pressure dumping over the relief valve, and the rapidly declining pump efficiencies, make that the worst choice in terms of power consumption. It wastes a lot of fuel as can be seen from the attached comparison chart.

The pump efficiencies are factual efficiencies obtained at these temperatures. The gear pump volumetric efficiencies decline very rapidly within a few months of operation. The losses shown in bold fonts at the bottom of the chart are averaged for operation at the two pressures and 750 and 1200 rpm operation. The obtained value is again averaged with a 50% duty cycle where the collection operation is only 50% of the time with the rest driving. Actual figures are lot higher for collection operation. Also the thermal efficiency in translating the energy loss to horsepower assume a 42% thermal efficiency of diesel engines, a figure not achieved by domestic diesel engines, which run around 36-38%. As such, these savings are considerably understated.

Front Loader

Figure 11A:
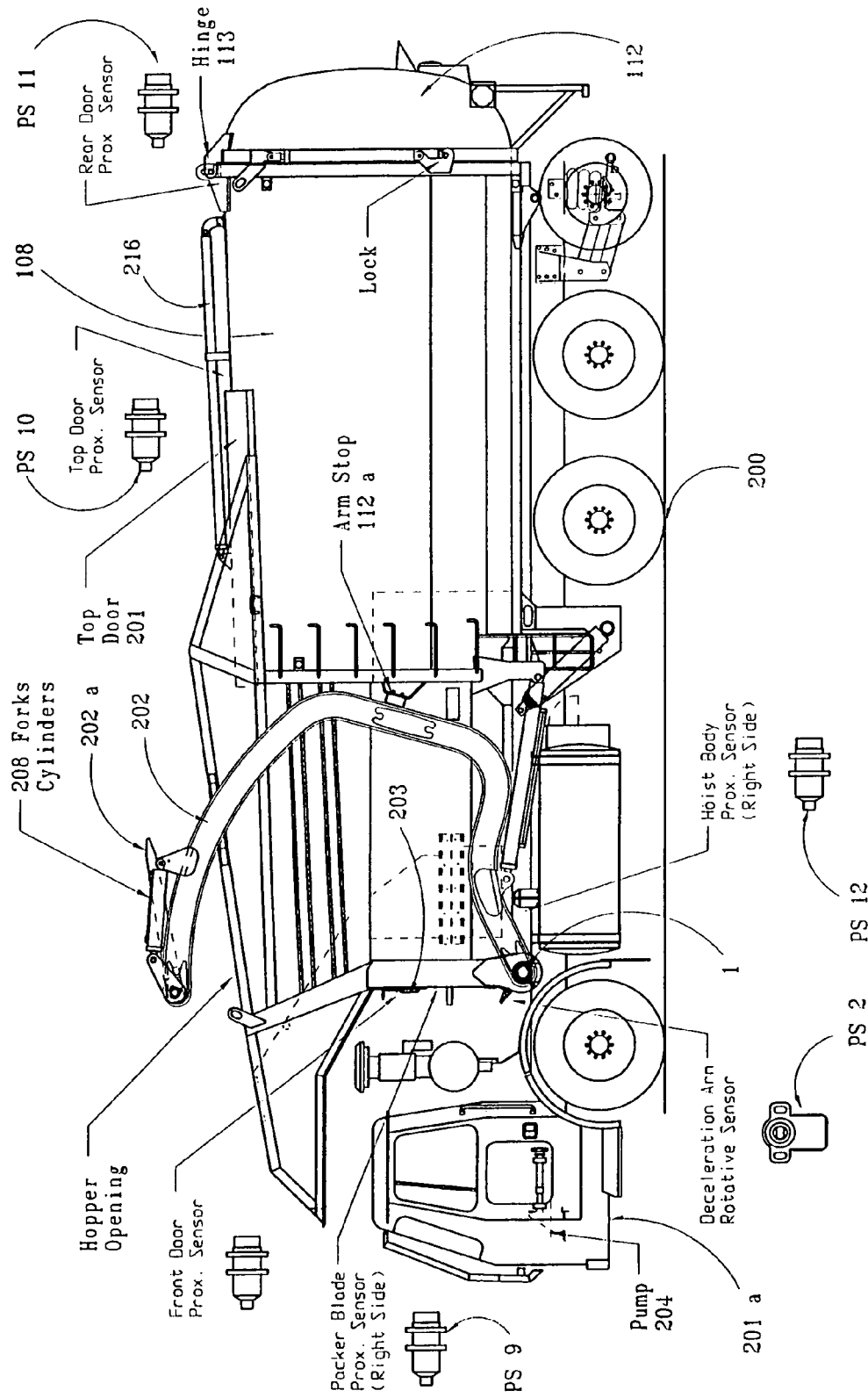
FIG. 11A is a side elevational view of a front loading refuse vehicle of this invention.
Figure 11:
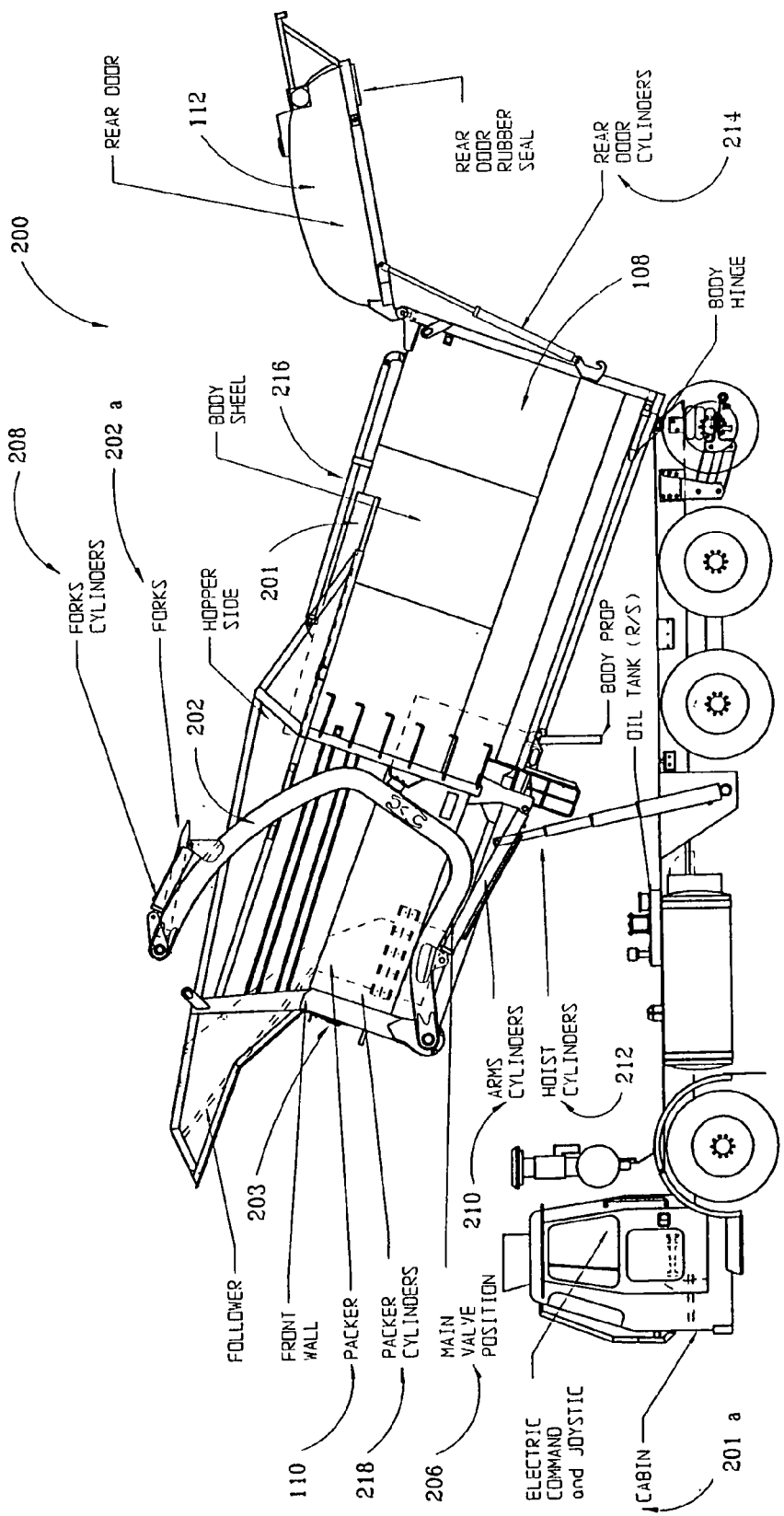
FIG. 11B is a side elevational view of the front loading refuse vehicle shown in FIG. 11A with its refuse storage body raised and rear door open.

As shown in FIGS. 11A and 11B, the front loading refuse vehicle 200 of this invention includes a pair lifting arms 202 (only one shown), each mounted on one side of the vehicle, to move between a raised position shown in solid lines in FIG. 11A and a lowered position in front of the cab 201a shown in dotted lines in FIG. 11A. Pins 202c (only one shown) attached the arms 202 to the refuse storage body 108 to rotate between the raised and lowered positions. A pair of forks 202a is pivotably connected to the arms 202, so that with the arms lowered, and the forks repositioned, these forks may be pushed into a pair channels in a bin type container (not shown) aligned with the forks. This embodiment of the invention only employs a single positive displacement pump 204 (FIG. 12) mounted in the cab 201a (FIG. 11A). Also the refuse storage body 108 has a front door 203 that provides access to the inside of the refuse storage body.

Figure 12:
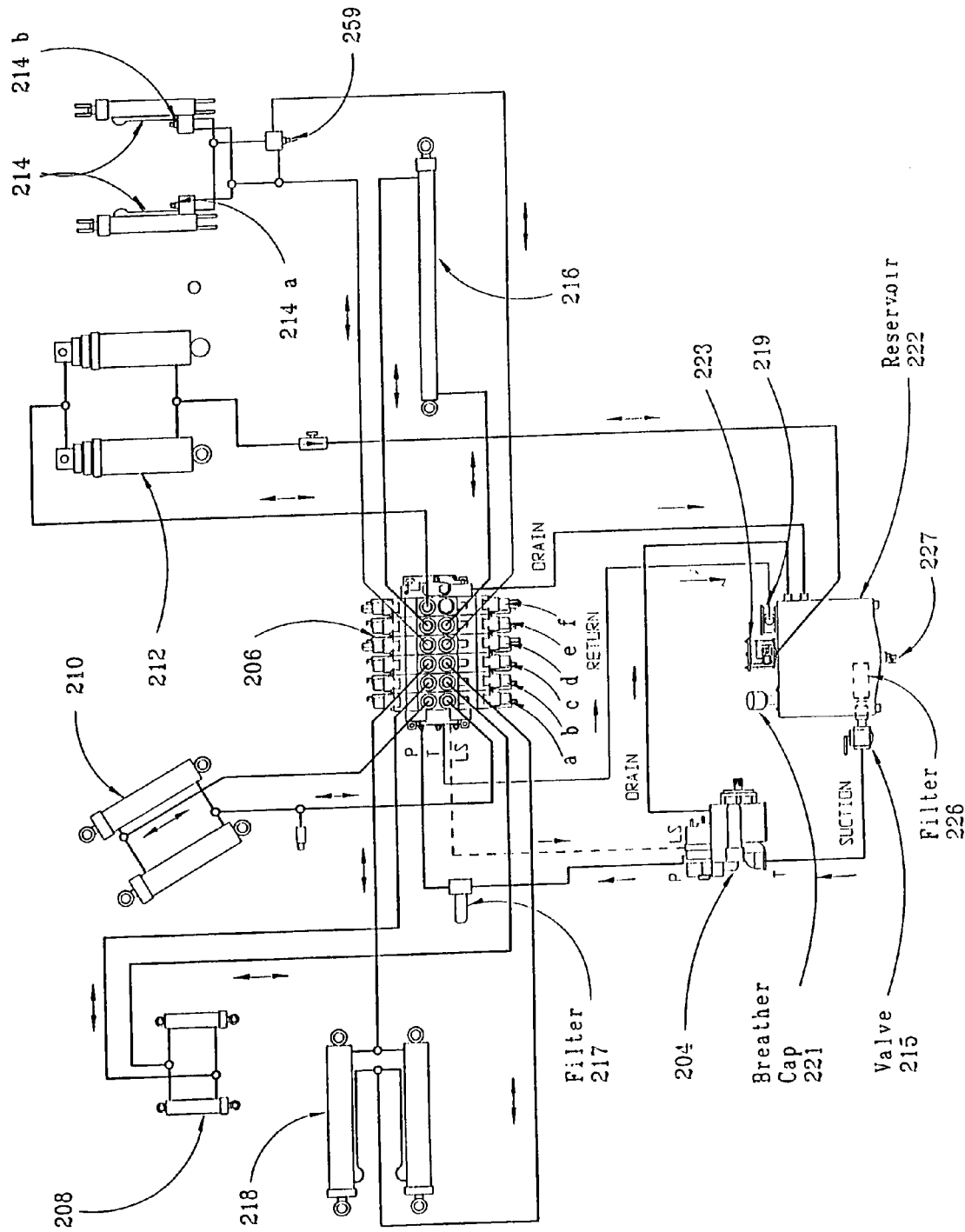
FIG. 12 is a simplified schematic diagram of the hydraulic system for the front loading refuse vehicle shown in FIGS. 11A and 11B.

As depicted in FIGS. 11B and 12, the pump 204 has an associated valve system 206 mounted on the refuse storage body 108. The valve system 206 includes six spool valves a through f in fluid communication with the hydraulic cylinders 208, 210, 212, 214, 216, and 218. The cylinders 208 are actuated to extend and retract the forks 202a, the cylinders 210 are actuated to raise and lower the arms 202, the cylinders 212 are actuated to operate the hoist 108a to raise and lower the refuse storage body 108 (the same in both vehicles), the cylinders 214 are actuated to open and close the rear door 112 (same in both vehicles), the cylinder 216 is actuated to open and close a top door 201 on the top of the refuse storage body 108, and the cylinders 218 (FIG. 12) is actuated to operate the packer 110 and its blade 110a (same in both vehicles).

As illustrated in FIG. 12, the spool valves a through f are in fluid communication with these hydraulic cylinders 208, 210, 212, 214, 216, and 218 and each cylinder is a conventional closed-centered, pressure compensated valve like those discussed above in connection with the side loading vehicle 100. These spool valves a through f each include a spool mechanism SM having a pressure compensator PC to maintain a constant flow rate of fluid through the valve regardless of differential in pressure across the valve for any given position of the spool mechanism. The highest load pressure amongst the valves a through f is sensed hydraulically to adjust the pressure compensator to that pressure plus a predetermined additional amount of standby pressure. As with the side loader, the pressure compensated flow through each closed-centered valve is maintained at a constant flow of hydraulic fluid (cylinder speed) regardless of pressures.

The position of the spool mechanism SM may be controlled directly by an electrical/electronic control system CS2 that moves the spool mechanism without the use of an external pneumatic drive media such as pressurized air. The electrical/electronic control system CS2 controls the position of the valve spool mechanism SM to vary the speed and govern the direction of movement of hydraulic cylinder to which a valve is in communication. The electrical/electronic control system CS2 may include a programmable microprocessor MP2 (FIG. 14) having program routines for controlling the different functions.

In accordance with this embodiment of the invention, the pump 204 is a variable displacement, pressure-compensated, load-sensing, piston pump capable of producing 5,000 psi but running at 3000 psi to power the front loading functions. The pump 204 produces only the flow required to perform the function called for by the valve system 206. The pump 204 is mounted in front of the engine between the radiator and the front bumper and driven by a propeller shaft mounted on the front engine crankshaft damper. The pump 204 sucks hydraulic fluid from the hydraulic fluid reservoir 222 through a 100-micron suction filter 226 and an isolation valve 215. The high-pressure discharge flow from the pump 204 passes through a 10 micron high pressure filter 217 and supplies the flow to the pressure-compensated, load-sensing, electro-hydraulic, close-centered valve system 206.

Figure 14:
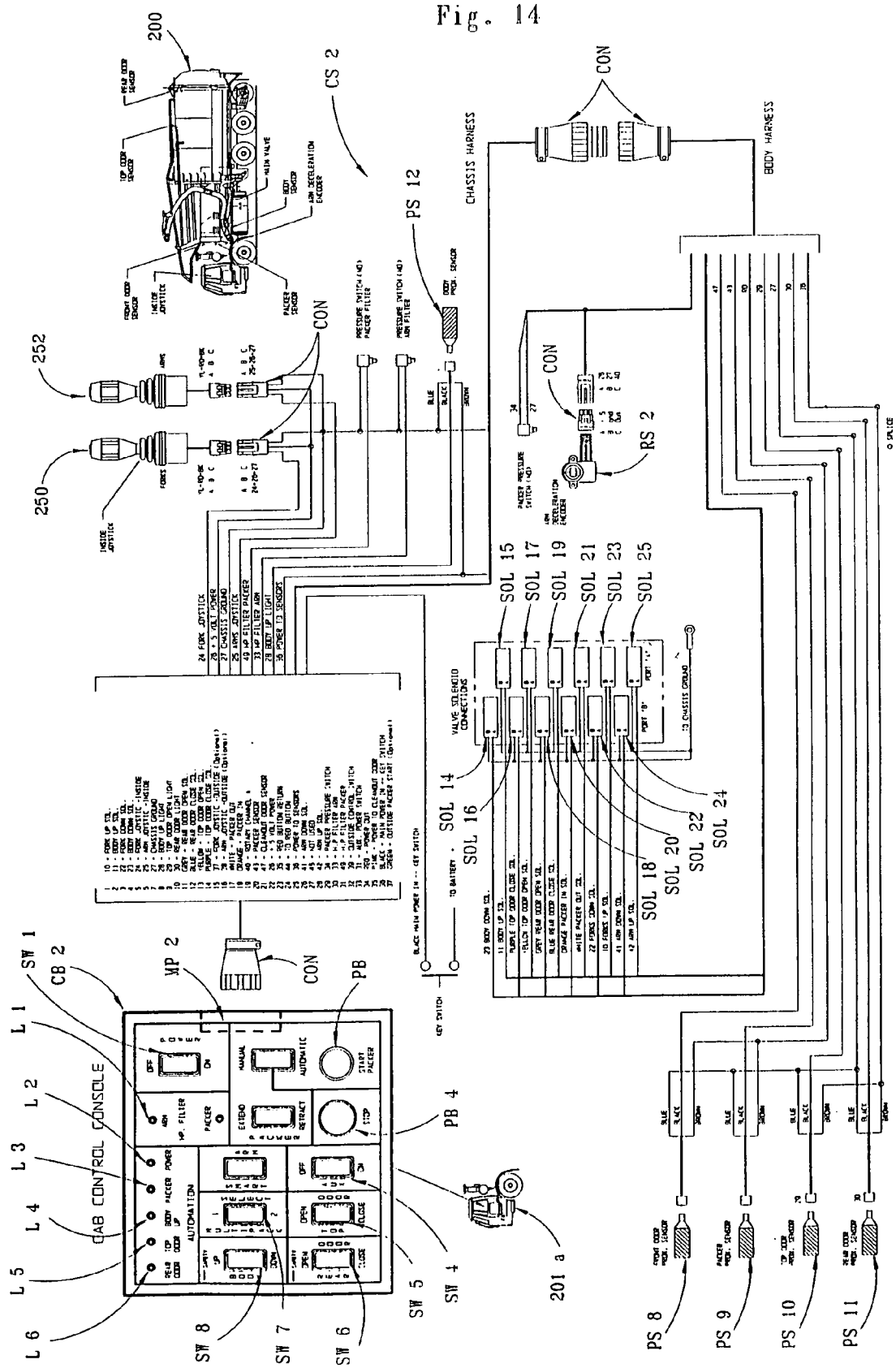
FIG. 14 is a schematic diagram of the electrical/electronic control system used with the front loading refuse vehicle shown in FIGS. 11A and 11B.

As depicted in FIG. 14, the valve system 206 receives electronic control signals through the programmable microprocessor MP2 of the electrical/electronic control system CS2 to energize each function as required. The microprocessor MP2 is mounted inside a control box 254 (FIG. 15) in the vehicle operator's cab 201a. Solenoids SOL14 through SOL19 are On/Off solenoids used to control the operation of the top-door 201, rear door 112, and the hoist 108a for the refuse storage body 108. The solenoids SOL20 through SOL25 are Pulse Width Modulation (PWM) solenoids that position a valve to set the flow therefrom according to the position of its spool. The solenoids SOL20 through SOL25 in conjunction with other components of the electrical/electronic control system CS2 control the operation of the arms 202, forks 202a, and packer 110. Proximity sensors PS8, PS9, PS10, PS11, PS12 and a rotary position sensor RS2 are used in a similar fashion to the comparable sensors used in connection with the vehicle 100. A series of warning lights L1 through L6 are on the control box 254. Components of the electrical/electronic control system CS2 also include a packer manual/automatic switch SW2, a packer extend/retract switch SW3, auxiliary switch SW4, a top door switch SW5, a rear door switch SW6, a multi-pack select switch SW7, a refuse storage body switch SW8, an automatic start packer push button PB1, a rear door safety button PB2, a refuse storage body safety button PB3, and an automatic stop/reverse packer push button PB4. The push button PB4, which is red in color and mushroom shaped, is an emergency stop control. Conventional electrical connectors CON connect together the electrical lead lines and components of the electrical/electronic control system CS2.

FIG. 11A shows the location of the sensors PS8, PS9, PS10, PS11, PS12 and RS2. The sensor PS8 that detects the position of the front door 203 is located adjacent this door. The sensor PS9 that detects the position of the packer blade 110a is located inside the refuse storage body 108 to one side. The sensor PS10 that detects the position of the top door 201 is located near an end of the top door 201. The sensor PS11 that detects the position of the rear door is located next to a hinge 113 that attaches the rear door 112 to the refuse storage body 108. The sensor PS12 that detects the position of the refuse storage body 108 is located along the refuse storage body support structure 108b. The rotary position sensor RS1 continuously monitors the position of the arms 202 as they rotate to detect the arms' up/down position.

The pressure compensation feature of the valves a through f keeps the flow, and hence speed, constant regardless of the pressure variation for that function for any position of an input device such as, for example, the joysticks 250 and 252 (FIG. 14) in the cab 201a. The joystick 250 is a Hall effect single-axis joystick and the joystick 252 is a single-axis joystick. The load-sensing part of a valve senses the function pressure requirements and supplies a pressure signal to its load-sensing pressure compensator PC to limit the pump pressure to that value. In effect, this invention only produces the flow required and at the pressure required. Also, no flow goes through a valve to the return lines unless the return flow is generated by the energized function. Thus, no energy is wasted and no relief valves are used. (All valves a through f are each equipped with a manual over-ride to activate the function in case the electrical/electronic control system CS2 sustains damage or fails. The over-ride can be activated with a small screw driver by pushing into a slot in a solenoid-mounted male half of an electrical connector CON, after un-plugging the female half of this connector CON.) As depicted in FIG. 12, the return flow from the valve system 206 discharges into a hydraulic reservoir 222 through a 10-micron return filter 219. The 45 gallon hydraulic reservoir 222 includes a suction strainer 226, a 10 micron breather cap 221, a drain plug 227, an isolation ball-valve 215, an electrically operated "Dyna Jack" 223, and a hydraulic fluid level sight gage-thermometer combination that indicates fluid level and temperature (not shown). The "Dyna Jack" 223 is a back-up device that is electrically powered to raise the refuse storage body 108 if the engine or the hydraulic system becomes in-operable, thus allowing access to the control valves and the chassis mounted hydraulics or chassis components. The valve d that raises or lowers the rear door 112, raises this door through two cylinder-mounted counter-balance valves 214a and 214b (FIG. 12). This ensure that even if the hydraulic line to either or both cylinders 214 gets removed, cut, or disconnected, the rear door 112 would stay in its position and would not drop. Similarly, an externally mounted single counter-balance valve 259 would not allow the door 112 to move up or open unless the control valve d commands it to do so.

The command and control functions are provided by the microprocessor MP2 in conjunction with the selective actuation of the switches SW1 through SW1 and the push buttons PB1 through PB4 and the joysticks 250 and 252. The joysticks 250 and 252 enable the vehicle's operator to control the movement and speed of the arms 202 and the forks 202a. By manipulating the position of the joysticks 250 and 252, the operator controls the speed of movement. The farther a joystick is pushed, the faster the movement of the arms 202 and the forks 202a. The lights L1 through L6 work only when the power to the control box is turned on by pushing a 'Power' rocker switch SW1 On when the ignition switch of the vehicle 200 is also On to indicate that the power is available at the control box 254. The push button PB4 would also light up to indicate that the power to the control system CS2 has been turned ON.

The microprocessor MP2 may be programmed to include a routine providing at least one interlocking safety feature to avoid the use of external safety device. For example, the interlocking safety feature may be preventing tilting of the refuse storage body 108 if the front door 203 is open or preventing the operation of the lifting arms 202 if the top door 201 is open.

Operation

The systems of the vehicle 200 are designed to operate all control functions at engine low idle (750-800 rpm). The fluid flow required by each function is controlled by the valve system 206 and the electronic control system CS2. Load or the engine speed does NOT change the speed of any function. Therefore, raising engine speed does not increase operational speed and only wastes fuel. The operation of this embodiment of the invention is as follows:

To Start

Figure 15:
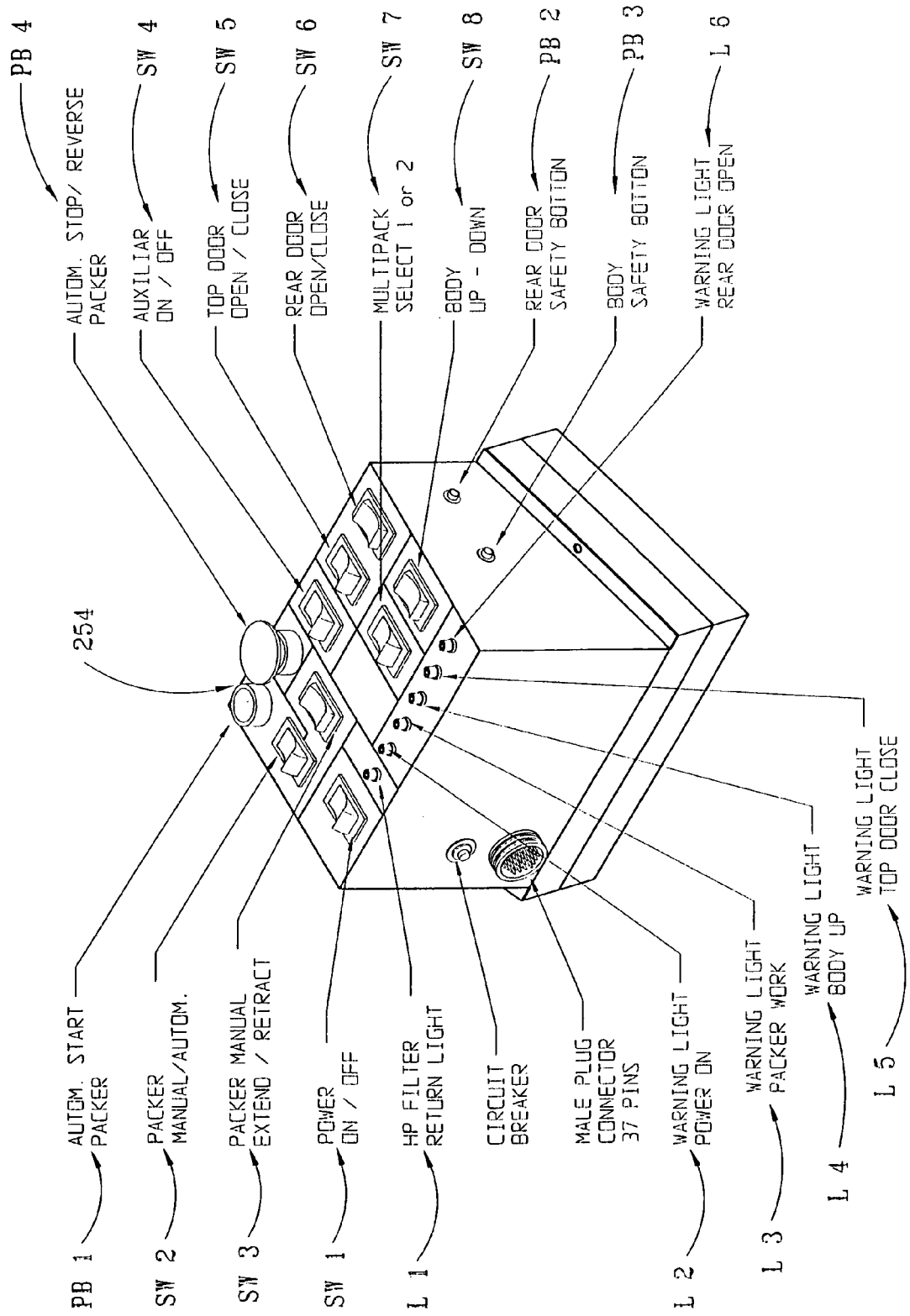
FIG. 15 is a perspective view of the control box used with the front loading refuse vehicle shown in FIGS. 11A and 11B.

Start the vehicle's engine and turn On the power to the control system CS2 by turning on the Power rocker Switch SW1 (FIG. 15). Check to confirm that the rear door 112 is closed (Rear Door light L6 is Off). Check to confirm that the refuse storage body 108 is down (the Body light L4 is Off). Check to confirm that the top door 201 is fully open (the Top door light L5 is On). The arms 202 would not function unless the top door 201 is fully open. Confirm that the front access door 203 is fully closed and the sensor light L5 is ON.

Figure 13:
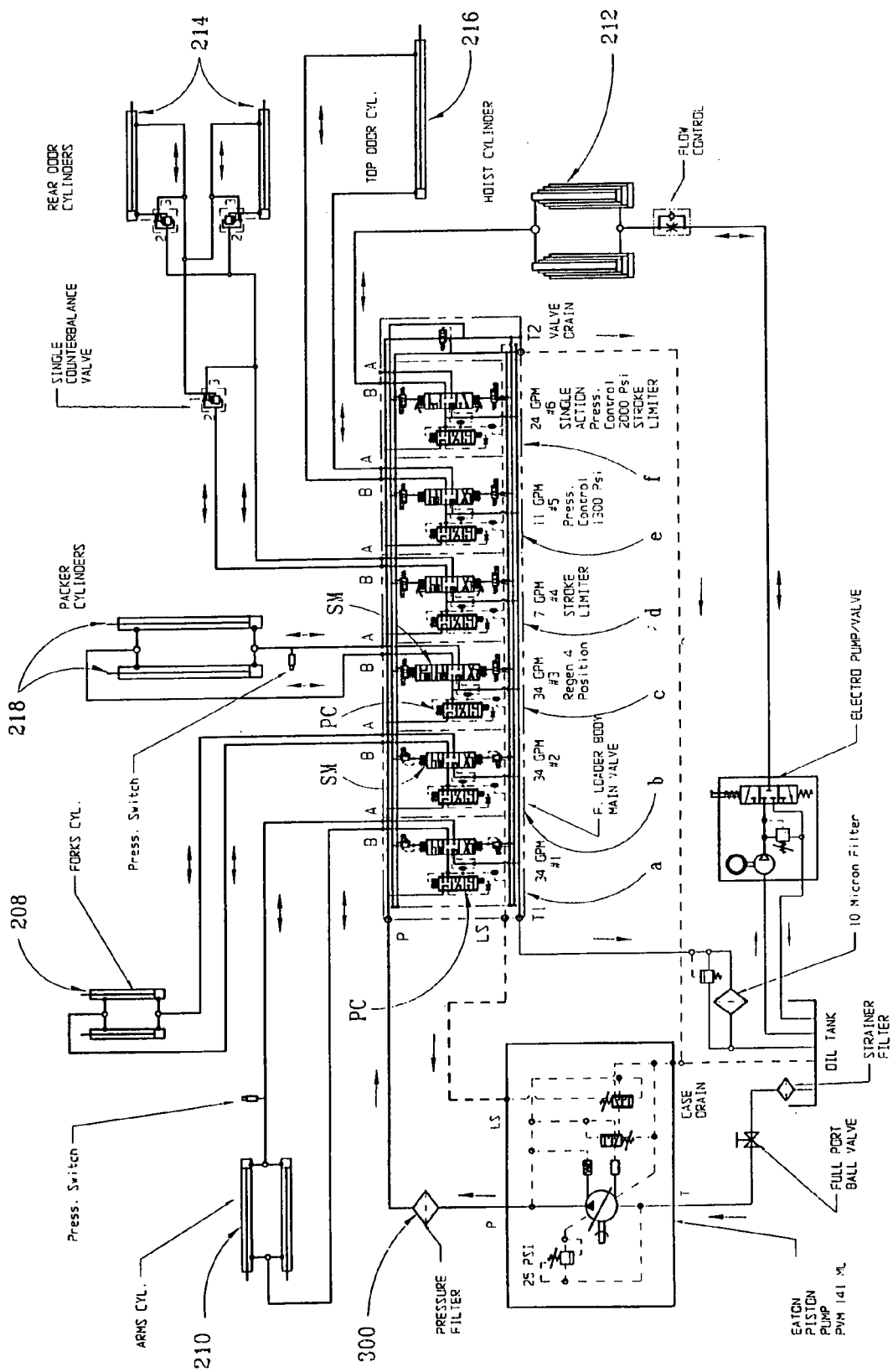
FIG. 13 is a detailed schematic diagram of the hydraulic system for the front loading refuse vehicle shown in FIGS. 11A and 11B.

After starting and warming up the hydraulic system, check the high pressure filter condition light L1 on the control box 254. If the light L1 is on, that means that a high pressure filter 300 (FIG. 13) is plugged and has gone into the "By-Pass" mode. Do not operate the hydraulic system for more than an hour under this condition and replace the high pressure filter 300 as soon as possible. Check the condition of the return line filter 219 of the reservoir 222. This filter 219 may be equipped with a gage, 25 psi of differential pressure across the filter element opens a by-pass valve and the fluid starts going around the filter element, i.e. unfiltered fluid starts to go through the filter. If the filter 219 is equipped with a "Pop-Up" sight gage, a popped up indicator represents the same plugged filter condition. An electric indicator that will turn on a light on the control box 254 is also available as an optional feature.

Operation with either of the filters in the by-pass mode should be avoided.

Loading Arms

The front loading arms 202 are operated by the joystick 252. Moving the joystick 252 towards the operator's body (as marked on a label "Up") will raise the arms 202, and pushing it away from the operator's body will lower the arms 202. Two modes of operation are provided for the movement of these arms 202. On the control box 254 the rocker switch SW2 shows "Automatic" and "Manual" positions. Only the "Automatic" position of the switch SW2 puts both the arms 202 and the packer 110 in automatic operation, whereas "Manual" position would put both the arms and the packer in "Manual" operation mode. In the "Manual" position, the control of the arms 202 is only designed for shop use. The automatic arm speed control function does not work in this "Manual" position. In the "Automatic" mode, the arms 202 automatically slow down to a smooth stop at the "Up" position and at the preset "Down" position.

A preset "Down" position is set through an arm calibration procedure only by the shop personnel. The "Down" position is set to allow stabbing the forks 202a into the channels of a lowest bin type container. Between the "Up" and "Down" position extremes, the vehicle operator has complete control of the speed of the arms 202. The farther the joystick 252 is moved, the faster would the arms travel. Because the valve system 206 is pressure compensated, the position of the arms 202 would thus control the speed of arms regardless of the load on the arm or the engine speed. At near the end of the "Down" and "Up" positions the program of the microprocessor MP2 takes control to slowdown smoothly the arms 202 to a stop.

To safeguard against banging the arms 202 into a rubber cushion arm stop 112a (FIG. 11A) on the "Up" positions, and against the end of the cylinder 210 in the "Down" position, an automatic safety stop program is a routine that is built into the microprocessor MP2. In accordance with this invention, an automatically "cushion" limits arm movement by slowing down the arms 202 to a smooth stop without banging the rubber cushion arm stop 112a or the cylinder 210. The vehicle operator can ease off on the joystick 252 to stop higher than the preset "Down" position to pick or release a container that is higher than the "Down" position. The operator would need to exercise control to make sure that the containers are not banged into the ground. If the arms 202 are required to go below the set "Down" position, depressing button PB4 will allow the arms to go lower slowly. To move up, the joystick 252, which is operational at all time, is used.

Fork Control

The operation of the forks 202a is a single function controlled by the joystick 250. The vehicle operator by manipulation of the joystick 250 controls the "Up" and "Down" movement of the forks 202a. As with the control of the arms 202, pushing the joystick 250 away from the operator's body lowers the forks 202a. Pushing the joystick 250 towards the operator's body raises the forks 202a. Like the arms 202, the fork control function is also proportional. The farther the joystick 250 is moved, the faster the forks 202a move. Again, each joystick position corresponds to a certain fork speed that would not change regardless of the load or the engine speed. Caution should be exercised to make sure that the forks 202a are in the fully "UP" position before moving the vehicle 200 to avoid ramming the forks into elevated structures in the arm "Up" position, or running the forks into people or objects in front of the vehicle in the arm "Down" or in front of the cab position.

Packer Control

When the "Automatic/Manual" rocker switch SW2 is in the "Manual" mode, the packer 110 can be moved inward by depressing the spring-centered rocker switch SW3 marked "Packer" at the Extend end, or outward by pressing the rocker switch SW3 at the Retract end. Releasing the switch SW3 would stop the packer 110 at the position the packer 110 is at when the switch SW3 is released. In the "Automatic" Mode, the packer cycle may be initiated by pressing the button PB1. Once this button PB1 is depressed, the packer 110 goes through a complete automatic cycle of extending and retracting before coming to rest in the retracted position unless the button PB4 is pressed to stop at an intermediate position. The automatic cycle of extending and retracting the packer 110 is in accordance with a routine provided by the program of the microprocessor MP2. In the "Automatic" mode, two packer cycle operations may be available using the rocker switch SW7. Depressing the switch SW7 to a position marked "1" makes the packer 110 go through One Cycle automatically once the "Start" button PB1 is pressed. Position "2" cycles the packer 110 twice before it parks itself in the retracted position in accordance with another routine provided by the program of the microprocessor MP2. The "packer" light L3 comes on as soon as a command to operate the packer 110 is given in either the "Manual" or the "Automatic" modes.

Rear Door Control

The rear door 112 is operated by actuation of the rocker switch SW6. However, to prevent inadvertent or accidental opening of the door 112, the rocker switch SW6 operation would NOT open or close the door. The rocker switch SW6 is only enabled by depressing and holding down the button PB2. In other words, first depress and hold the button PB2 before depressing the switch SW6 to Open or Close the rear door 112.

Top Door Control

The switch SW5 is the control for the top door 201. This switch SW5 is spring centered in a neutral position. Depressing the open side of this switch SW5 opens the top door 201 and depressing the closed side closes the top door. The arms control function of the program of the microprocessor MP2 does not allow the arms 202 to move upward if the top door 201 is not fully open.

Refuse Storage Body Hoist Control

The refuse storage body hoist control is also protected by the program of the microprocessor MP2 against inadvertent operation to safeguard against rollover of the vehicle 200. b. The switch SW8 controls the operation of the refuse body hoist 108a. This spring neutral rocker switch SW8 can be depressed in either a "Body Up" or "Body Down" position to operate the hoist 108a. c. The control function would not be enabled unless the button PB3 is depressed and held down.

Optional Arm Control

An optional feature may be a routine in the program of the microprocessor that eliminate control of the attitude of the arms 202 and forks 202a by the vehicle operator. With such a routine, the vehicle operator only has to stab the forks 202a into the container, depress a button (not shown) on the joystick 252 and yank and hold this joystick. The forks 202a automatically adjust to maintain container attitude according to the arm position to ensure that the container does not hit the cab or its canopy. The arms 202 would lift the container to the refuse storage body, dump the load, and return the container stopping at the height automatically where the button on the joystick was pressed to start the automation.

General

The electrical/electronic control systems of both vehicles 100 and 200 provide direct control of the spool mechanisms SM of the valves through the use of "Pulse-Width Modulation (PWM)" or analog voltage or current modification. This not only brings about precise control that is not available through a compressible pneumatic media such as air (that moves the spool mechanisms of the valves in the conventional systems), it also is unlike such pneumatic systems where a noticeable time lag is present. Thus, this invention makes the control of each control function precise, predictable, and repeatable in addition to being more reliable by removing the unnecessary intermediate electric to air system that increases complexity and cost.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. A refuse vehicle including
   a lifting arm mounted to the vehicle, said arm having a container holding and lifting apparatus,
   a refuse storage body including a packer that pushes refuse towards a rear door, said rear door upon being opened, and the body tilted, allows compacted refuse to be discharged,
   a hoist for tilting said body,
   a positive displacement pump with an associated valve system in fluid communication with a drive mechanism that operates the packer, the rear door, the hoist, and the lifting arm,
   said valve system including a plurality of closed-centered valves each with a spool mechanism having a pressure compensator to maintain a constant flow rate of fluid through each valve regardless of differential in pressure across each valve for any given position of the spool mechanism, and
   an electrical/electronic control system that controls the speed and direction of movement of the spool mechanisms, the highest load pressure amongst the valves being sensed to adjust an associated pump pressure compensator to that pressure plus a predetermined additional pressure, pressure compensated flow control through each said valve being maintained at a constant flow of hydraulic fluid proportional to spool mechanism position of a respective said valve regardless of pressures.

2. The refuse vehicle of claim 1 where the electrical/electronic control system includes a programmable microprocessor.

3. The refuse vehicle of claim 2 where the microprocessor includes a program routine that provides a regenerative feature for at least one of operational functions of the vehicle.

4. The refuse vehicle of claim 3 where the regenerative feature enables hydraulic fluid to be recycled between a cap side and a rod side of one of said valves.

5. The refuse vehicle of claim 4 where said one valve operates the drive mechanism for the lifting arm to control down and out motion of said lifting arm.

6. The refuse vehicle of claim 4 where said one valve operates the drive mechanism for the packer, said regenerative feature being enabled upon a predetermined pressure being detected by a pressure sensor monitoring pressure at an output end of said one valve.

7. The refuse vehicle of claim 2 where the microprocessor has a program routine that provides an interlocking safety feature.

8. The refuse vehicle of claim 2 where the electrical/electronic control system includes a plurality of manually operated control devices mounted in a cab of the vehicle.

9. The refuse vehicle of claim 8 where at least some of the manually operated control devices are components of a control box in the cab.

10. The refuse vehicle of claim 9 where at least some of the manually operated control devices include a plurality of warning lights, each light associated with a different operational function of the vehicle.

11. The refuse vehicle of claim 1 where a drive mechanism for the packer is controlled so that the packer smoothly stops and smoothly reverses direction.

12. The refuse vehicle of claim 1 where the lifting arm has a predetermined motion profile that is a function of shaping of an electrical control signal.

13. The refuse vehicle of claim 12 where the motion profile is shaped so that up/down motions of the lifting arm are accelerated and decelerated to minimize cycle time, allow time for refuse to drop out of the refuse storage body in a dump position, and provide timely and strategically placed decelerations when the storage body is returned to ground after dumping refuse.

* * * * *